United States Patent
Hosoya

(10) Patent No.: US 9,741,382 B2
(45) Date of Patent: Aug. 22, 2017

(54) HEXAGONAL FERRITE POWDER AND MAGNETIC RECORDING MEDIUM

(71) Applicant: FUJIFILM Corporation, Tokyo (JP)

(72) Inventor: Yoichi Hosoya, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/673,282

(22) Filed: Mar. 30, 2015

(65) Prior Publication Data
US 2015/0279408 A1 Oct. 1, 2015

(30) Foreign Application Priority Data

Mar. 31, 2014 (JP) ................................. 2014-074718
Mar. 30, 2015 (JP) ................................. 2015-069177

(51) Int. Cl.
| | | |
|---|---|---|
| *G11B 5/708* | (2006.01) | |
| *G11B 5/706* | (2006.01) | |
| *C01G 49/00* | (2006.01) | |
| *H01F 1/11* | (2006.01) | |

(52) U.S. Cl.
CPC ...... *G11B 5/70678* (2013.01); *C01G 49/0036* (2013.01); *H01F 1/11* (2013.01); *C01P 2004/54* (2013.01); *C01P 2004/64* (2013.01); *C01P 2006/42* (2013.01); *Y10T 428/2982* (2015.01)

(58) Field of Classification Search
CPC ............. C01G 49/0036; C01P 2004/54; C01P 2004/64; C01P 2004/42; H01F 1/11
See application file for complete search history.

(56) References Cited

U.S. PATENT DOCUMENTS

| | | | |
|---|---|---|---|
| 8,124,256 B2 | 2/2012 | Kuse et al. | |
| 2005/0003235 A1* | 1/2005 | Masaki ................. | G11B 5/714 428/845 |
| 2006/0035114 A1 | 2/2006 | Kuse et al. | |
| 2010/0055505 A1* | 3/2010 | Omura et al. ............ | 428/840.2 |
| 2012/0156524 A1* | 6/2012 | Kawakami et al. .......... | 428/836 |
| 2012/0177951 A1 | 7/2012 | Yamazaki et al. | |

FOREIGN PATENT DOCUMENTS

| | | |
|---|---|---|
| JP | 2002-298331 A | 10/2002 |
| JP | 2005-322280 A | 11/2005 |
| JP | 2006-054000 A | 2/2006 |
| JP | 2009-208969 A | 9/2009 |
| JP | 2012-142529 A | 7/2012 |

OTHER PUBLICATIONS

Office Action dated Mar. 22, 2016 from the Japanese Patent Office in counterpart JP Application No. 2015-069177.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to hexagonal ferrite powder, which comprises equal to or more than 70% on a particle number basis of isotropic hexagonal ferrite particles satisfying equation (1):

major axis length/minor axis length<2.0 (1), having an average particle size of equal to or greater than 10.0 nm but equal to or less than 35.0 nm, and having a saturation magnetization of equal to or greater than 30 $A \cdot m^2/kg$.

21 Claims, 8 Drawing Sheets

HEXAGONAL FERRITE POWDER AND MAGNETIC RECORDING MEDIUM

CROSS-REFERENCE TO RELATED APPLICATIONS

This application claims priority under 35 U.S.C 119 to Japanese Patent Application No. 2014-074718 filed on Mar. 31, 2014 and Japanese Patent Application No. 2015-69177 filed on Mar. 30, 2015. Each of the above applications is hereby expressly incorporated by reference, in its entirety.

BACKGROUND OF THE INVENTION

Field of the Invention

The present invention relates to hexagonal ferrite powder and a magnetic recording medium Discussion of the Background Hexagonal ferrite powder is widely employed as the ferromagnetic powder contained in the magnetic layers of magnetic recording media. The coercive force thereof is great enough for use in permanent magnetic materials. The magnetic anisotropy that is the basis of the coercive force derives from its crystal structure. Thus, high coercive force can be maintained even when the size of the particles is reduced. Further, magnetic recording media employing hexagonal ferrite in a magnetic layer have high density characteristics due to the vertical component. Thus, hexagonal ferrite is ferromagnetic powder that is suited to high density recording.

In recent years, various proposals have been made for improving hexagonal ferrite powder having the above excellent characteristics (for example, see Japanese Unexamined Patent Publication (KOKAI) No. 2009-208969, which is expressly incorporated herein by reference in its entirety).

SUMMARY OF THE INVENTION

Magnetic recording media, particularly in high-density recording media such as backup tapes, are required to be capable of extended use with high reliability, that is, to have good running durability. Thus, in particulate magnetic recording media (also referred to simply as "magnetic recording media" hereinafter) comprising a magnetic layer (coating) containing ferromagnetic powder and binder, the magnetic layer desirably has high coating durability such that it is not significantly scraped by sliding of the head against it during recording and reproduction.

In the field of magnetic recording, to increase the fill rate and decrease noise in the magnetic layer, it is required to reduce the size of the particles in the ferromagnetic powder contained in the magnetic layer. In this regard, Japanese Unexamined Patent Publication (KOKAI) No. 2009-208969 discloses placing organic molecules together in a hydrothermal synthesis reaction in the presence of supercritical water or subcritical water to control the size and the like of barium hexaferrite, a type of hexagonal ferrite powder. Japanese Unexamined Patent Publication (KOKAI) No. 2009-208969 states that barium hexaferrite with an average size of 8 nm is obtained in Example of Japanese Unexamined Patent Publication (KOKAI) No. 2009-208969 (see paragraph 0036 of Japanese Unexamined Patent Publication (KOKAI) No. 2009-208969).

With regard to magnetic characteristics, since a magnetic recording medium containing ferromagnetic powder with a high saturation magnetization as can achieve high output, it can achieve a better signal-to-noise ratio (SNR). Accordingly, a high saturation magnetization as in hexagonal ferrite powder is desirable from the perspective of obtaining a magnetic recording medium capable of achieving a high SNR. However, in Japanese Unexamined Patent Publication (KOKAI) No. 2009-208969, the barium hexaferrite obtained in Example of Japanese Unexamined Patent Publication (KOKAI) No. 2009-208969 is stated as having a lower saturation magnetization than that manufactured by previously reported manufacturing methods. In Japanese Unexamined Patent Publication (KOKAI) No. 2009-208969, it is stated that a reduction in saturation magnetization is generally known to accompany a reduction in particle size (see paragraph 0040 of Japanese Unexamined Patent Publication (KOKAI) No. 2009-208969).

As set forth above, in the field of magnetic recording, there is a need to reduce the particle size of ferromagnetic powder, increase the saturation magnetization, and increase the coating durability of the magnetic layer. However, based on research conducted by the present inventor, it is difficult to achieve all of these by means of the conventional methods, including the method described in Japanese Unexamined Patent Publication (KOKAI) No. 2009-208969.

An aspect of the present invention provides for hexagonal ferrite powder that can achieve both a reduction in the particle size of hexagonal ferrite powder and increased saturation magnetization, as well as permitting the formation of a magnetic layer of high coating durability.

An aspect of the present invention relates to hexagonal ferrite powder, which comprises equal to or more than 70% on a particle number basis of isotropic hexagonal ferrite particles satisfying equation (1):

$$\text{major axis length/minor axis length} < 2.0 \quad (1),$$

having an average particle size of equal to or greater than 10.0 nm but equal to or less than 35.0 nm, and having a saturation magnetization of equal to or greater than 30 A·m²/kg.

A magnetic recording medium having a magnetic layer containing ferromagnetic powder in the form of the above hexagonal ferrite powder was found to exhibit high coating durability in the magnetic layer based on examination by the present inventor. The fact that even hexagonal ferrite powder of small particle size could exhibit a saturation magnetization of equal to or greater than 30 A·m²/kg when it contained equal to or more than 70% based on a particle number basis of the above isotropic particles could not be anticipated from conventional methods, including the method disclosed in Japanese Unexamined Patent Publication (KOKAI) No. 2009-208969, and was discovered by the present inventor. The present inventor also discovered that a magnetic layer containing ferromagnetic powder in the form of the above hexagonal ferrite powder could exhibit high coating durability.

In this context, the particle size in the present invention refers to the major axis length, except in the cases specifically excluded below, and the average particle size refers to the average major axis length. The particle size is a value obtained by observation by a transmittance electron microscope. More specifically, the major axis length of 500 particles in a particle photograph directly taken with an electron microscope with an acceleration voltage of 100 kV (with a model H-9000 transmission electron microscope made by Hitachi, for example) is obtained, and the average value (arithmetic mean) of the major axis lengths of the 500 particles is adopted as the average major axis length. More specifically, a particle photograph is taken at a magnification of 100,000-fold and printed on photographic paper to a total magnification of 500,000-fold. Target particles are selected from the particle photograph, the outlines of the powder are traced with a digitizer, and image analysis software (such as Carl Zeiss image analyzing software KS-400) is used to measure the major axis length of the particles. The term "major axis length" refers to determining the longest axis (line) that can be run through the particle as the major axis, and taking the length of that axis. The term "minor axis" refers to determining the longest axis that can be run through the particle as a straight line perpendicular to the major axis, and adopting the length of that axis as the minor axis length. However, when the major axis constituting a particle cannot be specified due to the shape, the term particle size refers to the equivalent spherical diameter and the average particle size refers to the average equivalent spherical diameter. Specifically, a particle photograph is directly taken with an electron microscope (a model H-9000 transmission electron microscope made by Hitachi, for example) at an acceleration voltage of 100 kV, equivalent spherical diameters are obtained for the projected areas of 500 particles in the photograph, and the average value of the 500 particles is adopted as the average equivalent spherical diameter.

The term "isotropic" as relates to particles in the present invention means particles that are not tabular. The term isotropic includes elliptical, spherical, octahedral, and infinite shapes. The term "tabular" refers to a shape having a main surface. The term "main surface" refers to the outer surface accounting for the greatest area on the particle. An example of the shape of tabular hexagonal ferrite particles is a hexagonal flat shape. In a hexagonal flat shape, the surface that accounts for the greatest area is the outer surface of hexagonal shape. That portion is called the main surface.

The ratio (on a particle number basis) accounted for by isotropic particles satisfying equation (1) above in the hexagonal ferrite powder is obtained by measuring the major axis length and minor axis length of 500 randomly extracted particles, calculating the ratio (major axis length/minor axis length) thereof, and determining the ratio accounted for among the total number of particles (500 particles) by the number of isotropic particles satisfying equation (1) above among 500 particles. The major axis length and minor axis length are obtained by the method of observation by a transmission electron microscope described above with regard to the method of measuring the average particle size. The average particle size of the isotropic particles satisfying equation (1), described further below, refers to the average value (average major axis length (arithmetic average)) of the major axis length of all the particles determined to be isotropic particles that satisfy equation (1) among 500 particles the particle size of which has been measured by the above method. The coefficient of variation in the particle size of the isotropic particles satisfying equation (1), described further below, refers to a value that is obtained by calculating the standard deviation of the major axis length of the particles determined to be isotropic particles and dividing it by the average major axis length of the above isotropic particles.

The particle size, major axis length and minor axis length set forth above can be obtained by observing the powder that is present as powder by a transmission electron microscope. A measurement sample of the powder that is contained in a magnetic recording medium can be obtained by collecting powder from the magnetic recording medium. The measurement sample can be collected, for example, from a magnetic layer by the following method.

1. Subjecting the surface of the magnetic layer to 1 to 2 minutes of surface treatment with a plasma reactor made by Yamato Scientific Co., Ltd., and ashing the organic components (binder, curing agent and the like) of the surface of the magnetic layer to remove them.

2. Adhering filter paper that has been immersed in an organic solvent such as cyclohexanone or acetone to the edge portion of a metal rod, rubbing the surface of the magnetic layer that has been treated as in 1. above on it, and transferring the magnetic layer component from the magnetic layer to the filter paper to separate it.

3. Shaking off the component separated by 2. above in a solvent such as cyclohexanone or acetone (placing each piece of filter paper in solvent and using an ultrasonic disperser to shake it off), drying the solvent, and removing the separated component.

4. Placing the component that has been scraped off in 3. above in a glass test tube that has been thoroughly cleaned, adding n-butyl amine to about 20 mL of the magnetic layer component, and sealing the glass test tube. (The n-butyl amine is added in a quantity adequate to decompose the remaining binder or the like that has not been ashed.)

5. The glass test tube is heated for equal to or more than 20 hours at 170° C. to decompose the organic component.

6. The precipitate following the decomposition of 5. above is thoroughly washed with pure water and dried, and the powder is recovered.

7. A neodymium magnet is placed near the powder that has been collected in 6. and the powder that is attracted (that is, hexagonal ferrite powder) is collected.

Hexagonal ferrite powder can be collected from the magnetic layer by the above steps. Since the above processing can impart almost no damage to the particles, the above method permits measurement of the particle size of powder in the state in which it was contained in the magnetic layer.

In an embodiment, the coercive force of the hexagonal ferrite powder is equal to or greater than 159 kA/m but equal to or less than 318 kA/m (equal to or greater than 2,000 Oe but equal to or less than 4,000 Oe).

In an embodiment, the thermal stability of the hexagonal ferrite powder satisfies equation (A) below:

$$60 \leq KuV/kT \tag{A}$$

In equation (A), Ku denotes the anisotropy constant, V denotes the activation volume, k denotes the Boltzmann constant, and T denotes absolute temperature.

In an embodiment, the switching field distribution of the hexagonal ferrite powder is equal to or less than 0.8.

In an embodiment, the average particle size of the hexagonal ferrite powder is equal to or greater than 20.0 nm but equal to or less than 30.0 nm.

In an embodiment, the average particle size of the isotropic particles satisfying equation (1) above is equal to or greater than 10.0 nm but equal to or less than 30.0 nm.

In an embodiment, the average particle size of the isotropic particles satisfying equation (1) above is equal to or greater than 15.0 nm but equal to or less than 25.0 nm.

In an embodiment, the coefficient of variation in the average particle size of the isotropic particles satisfying equation (1) above is equal to or less than 30%.

In an embodiment, the hexagonal ferrite powder contains equal to or more than 80% on a particle number basis of isotropic hexagonal ferrite particles satisfying equation (1) above.

In an embodiment, the hexagonal ferrite powder is employed as ferromagnetic powder for magnetic recording.

A further aspect of the present invention relates to a magnetic recording medium, which comprises a magnetic layer comprising ferromagnetic powder and binder on a nonmagnetic support, wherein the ferromagnetic powder is the above hexagonal ferrite powder.

An aspect of the present invention can provide a magnetic recording medium affording both good electromagnetic characteristics and a magnetic layer with high coating durability.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
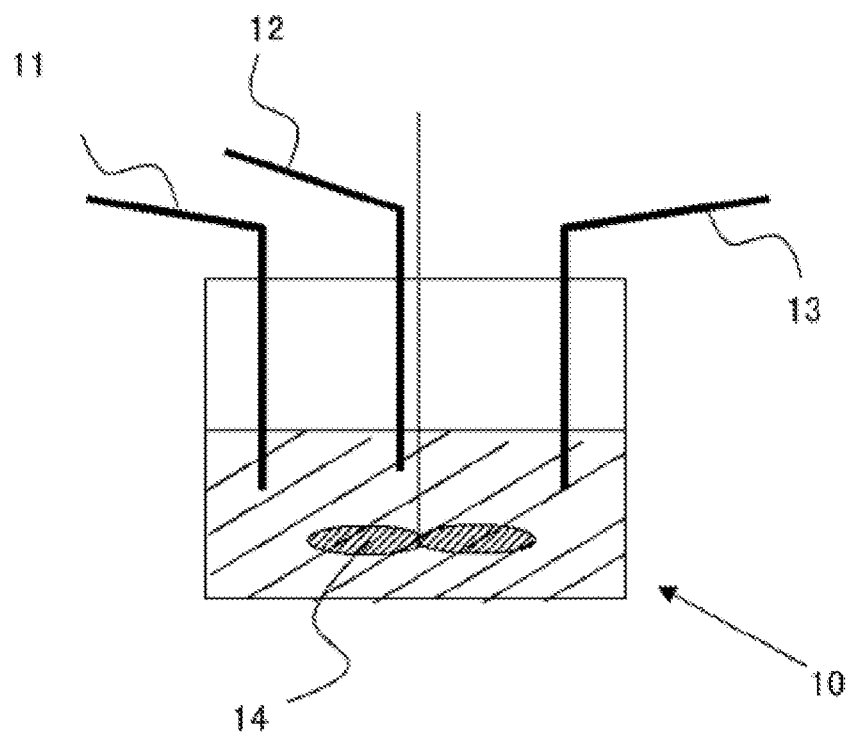
FIG. 1 is a schematic sectional view showing an example of a batch-type reaction tank that can be used to prepare precursor.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Hexagonal Ferrite Powder

An aspect of the present invention relates to hexagonal ferrite powder, which comprises equal to or more than 70% on a particle number basis of isotropic hexagonal ferrite particles satisfying equation (1):

$$\text{major axis length/minor axis length} < 2.0 \tag{1}$$

having an average particle size of equal to or greater than 10.0 nm but equal to or less than 35.0 nm, and having a saturation magnetization of equal to or greater than 30 $A \cdot m^2/kg$.

Details of the above hexagonal ferrite powder will be described below.

<Size and Shape of Hexagonal Ferrite Powder>

The average particle size of the above hexagonal ferrite powder is equal to or greater than 10.0 nm but equal to or less than 35.0 nm.

The average particle size is calculated by the method set forth above. Hexagonal ferrite powder with an average particle size of equal to or greater than 10 nm can have high magnetic stability and is suitable as ferromagnetic powder for magnetic recording. From this perspective, the average particle size is desirably equal to or greater than 12.0 nm, preferably equal to or greater than 15.0 nm. From the perspective of further enhancing the coating durability of the magnetic layer, the average particle size is desirably equal to or greater than 15.0 nm, preferably equal to or greater than 20.0 nm. Hexagonal ferrite powder with an average particle size of equal to or less than 35.0 nm is suitable as ferromagnetic powder for high-density recording. From this perspective, the average particle size is desirably equal to or less than 33.0 nm, preferably equal to or less than 30.0 nm.

As set forth above, in hexagonal ferrite powder having the above average particle size, it has conventionally been difficult to enhance the saturation magnetization. By contrast, the present inventor has discovered that hexagonal ferrite powder in which equal to or more than 70% of the particles, on a particle number basis, constituting hexagonal ferrite powder satisfy equation (1):

$$\text{major axis length/minor axis length} < 2.0 \tag{1}$$

and correspond to isotropic particles as defined above, can exhibit a high saturation magnetization. The above ratio (major axis length/minor axis length) of isotropic particles satisfying equation (1) is desirably equal to or higher than 1.0, preferably equal to or higher than 1.2. The ratio accounted for by isotropic particles satisfying equation (1) in the above hexagonal ferrite powder is desirably equal to or more than 75%, preferably equal to or more than 80%. The ratio accounted for by isotropic particles satisfying equation (1) can be, for example, equal to or less than 99%, equal to or less than 98%, or equal to or less than 96%. However, the higher the ratio accounted for by isotropic particles satisfying equation (1) the better; 100% is also possible.

The above hexagonal ferrite powder can be powder with little variation in particle shape which the majority of the particles constituting the powder (equal to or more than 70%) are isotropic particles satisfying equation (1). It is desirable from the perspective of enhancing the magnetic characteristics of the hexagonal ferrite powder for there to be little variation in particle size of the isotropic particles satisfying equation (1). From this perspective, the coefficient of variation in particle size of the isotropic particles satisfying equation (1) that are contained in the above hexagonal ferrite powder is desirably equal to or less than 30%, preferably equal to or less than 25%. The coefficient of variation in the particles size of the isotropic particles satisfying equation (1) can be, for example, equal to or higher than 10% or equal to or higher than 15%. However, the lower the better. The average particle size of the isotropic particles satisfying equation (1) is desirably equal to or greater than 10.0 nm, preferably equal to or greater than 12.0 nm, and more preferably equal to or greater than 14.0 nm. The average particle size of the isotropic particles satisfying equation (1) is desirably equal to or less than 30.0 nm, preferably equal to or less than 25.0 nm, and more preferably, equal to or less than 20.0 nm.

<Magnetic Characteristics, Thermal Stability>

The saturation magnetization of the above hexagonal ferrite powder is equal to or greater than 30 A·m$^2$/kg. Although it has conventionally been difficult to achieve a saturation magnetization of equal to or greater than 30 A·m$^2$/kg in hexagonal ferrite powder with an average particle size of equal to or greater than 10 nm but equal to or less than 30 nm, this can be achieved by reducing the variation in particle shape as set forth above. The saturation magnetization is desirably equal to or greater than 33 A·m$^2$/kg, preferably equal to or greater than 35 A·m$^2$/kg. From the perspective of reducing noise, the saturation magnetization is desirably equal to or less than 80 A·m$^2$/kg, preferably equal to or less than 60 A·m$^2$/kg.

As set forth above, low variation in the size and shape of the particles constituting the powder is desirable from the perspective of reducing variation in magnetic characteristics. In this regard, the switching field distribution (SFD), which indicates coercive force, is an example of an index of the variation in magnetic characteristics. The SFD of the hexagonal ferrite powder is desirably equal to or less than 0.8, preferably equal to or less than 0.7, and more preferably, equal to or less than 0.6. The SFD can be, for example, equal to or greater than 0.2. However, the lower the better.

Regarding magnetic characteristics, from the perspective of magnetization stability, the coercive force of the hexagonal ferrite powder is desirably equal to or greater than 159 kA/m (equal to or greater than 2,000 Oe), preferably equal to or greater than 199 kA/m (equal to or greater than 2,500 Oe). From the perspective of ease of recording (ease of writing), the coercive force is desirably equal to or less than 318 kA/m (equal to or less than 4,000 Oe), preferably equal to or less than 279 kA/m (equal to or less than 3,500 Oe). Coercive force within the above range can be achieved by reducing the variation in shape as set forth above.

Generally, in various magnetic powders including hexagonal ferrite powder, there may be tendency that the lower the particle size the greater the drop in the thermal stability of magnetization and the more recording retention tends to decrease. Accordingly, achieving both thermal stability of magnetization and a reduction in particle size has been demanded in the field of magnetic recording. By contrast, the present inventor discovered that hexagonal ferrite powder in which the variation in shape has been reduced as set forth above and the ratio accounted for by isotropic particles satisfying equation (1) is high also can afford good thermal stability of magnetization. KuV/kT is an example of an index of thermal stability. Ku denotes the anisotropy constant, V denotes the activation volume, k denotes the Boltzmann constant, and T denotes absolute temperature. KuV represents magnetic energy and kT represents thermal energy. Increasing the thermal energy KuV relative to the thermal energy kT makes it possible to inhibit the effects of thermal fluctuation. Thus, hexagonal ferrite powder with a high KuV/kT can be said to be ferromagnetic powder of high thermal stability. As stated above, variation in shape is reduced in the above hexagonal ferrite powder, thereby making it possible to state the thermal stability of magnetization as thermal stability satisfying equation (A) below:

$$60 \leq KuV/kT \tag{A}$$

KuV/kT is preferably equal to or higher than 70, more preferably equal to or higher than 75. By way of example, KuV/kT can be equal to or less than 100, or equal to or less than 90. However, the higher the better.

The magnetic characteristics and thermal stability set forth above can be determined with a known measurement apparatus that is capable of measuring magnetic characteristics, such as a vibrating sample magnetometer. Specific examples of measurement methods are given in Examples further below.

Employing the above hexagonal ferrite powder as ferromagnetic powder in a magnetic layer cam make it possible to form a magnetic layer of high coating durability (coating strength). In this regard, the present inventor presumes that the fact that isotropic particles satisfying equation (1) account for most of the particles constituting the powder can contribute to enhancing the coating durability of the magnetic layer. However, this is mere conjecture by the present inventor, and does not limit the present invention in any way.

<Manufacturing Method>

The hexagonal ferrite powder according to an aspect of the present invention can be manufactured by a manufacturing method that is known as a method of manufacturing hexagonal ferrite powder, such as a co-precipitation method, a reverse micelle method, a hydrothermal synthesis method, and a glass crystallization method. A manufacturing method based on a hydrothermal synthesis method will be described below as an embodiment of a desirable manufacturing method. However, the present invention is not limited by the embodiments presented below.

The hydrothermal synthesis methods are techniques for converting hexagonal ferrite precursor into hexagonal ferrite powder by heating a water-based solution containing a hexagonal ferrite precursor. Of them, from the perspective of readily obtaining hexagonal ferrite powder of small particle size, a continuous hydrothermal synthesis method of heating and pressurizing a water-based fluid containing hexagonal ferrite precursor while feeding it to a reaction flow passage to utilize the high reactivity of heated and pressurized water (also referred to hereinafter as "high-temperature, high-pressure water"), desirably water in a subcritical to supercritical state, to convert hexagonal ferrite precursor to ferrite is desirable.

In the continuous hydrothermal synthesis method, examples of specific techniques for controlling the shape of the hexagonal ferrite powder that is obtained are:

(1) inhibiting fluctuation in the pH of the reaction system during the preparation of the hexagonal ferrite precursor;
(2) conducting the reaction converting the hexagonal ferrite precursor into hexagonal ferrite in the presence of a reducing compound;
(3) controlling the solution temperature at the point of first contact of the high-temperature, high-pressure water, hexagonal ferrite precursor, and organic compound, described further below; and
(4) controlling the pH of the reaction system in which is conducted the reaction converting hexagonal ferrite precursor into hexagonal ferrite. The hexagonal ferrite powder according to an aspect of the present invention set forth above can be obtained by conducting any one, or any combination of two or more, of these techniques.

The above specific techniques will be further described in the detailed description of the continuous hydrothermal synthesis method below.

(Preparation of Hexagonal Ferrite Precursor)
(i) Starting Materials (Iron Salt, Divalent Metal Salt), Base, Water-Based Solvent The hexagonal ferrite precursor need only be a compound that can convert to hexagonal ferrite (ferrite conversion) when placed in the presence of high-temperature, high-pressure water. The high-temperature, high-pressure water refers to water that is heated and pressurized. The details are given further below. The precursor can exhibit high solubility in water and dissolve in the aqueous based solvent described further below, or can have poor solubility in water and can be dispersed (in sol form) as colloidal particles in the water-based solution.

Magnetoplumbite (M-type), W-type, Y-type, and Z-type crystal structures of hexagonal ferrite are known. The hexagonal ferrite obtained by the above manufacturing method can be of any crystal type. For example, M-type hexagonal ferrite not containing substitution atoms is a metal oxide denoted by $AFe_{12}O_{19}$. A denotes a divalent metal atom. The term "divalent metal atom" refers to a metal atom that is capable of becoming an ion in the form of a divalent cation. This includes alkaline earth metal atoms such as barium, strontium, and calcium, as well as lead and the like. The hexagonal ferrite may contain one or more substitution atoms that are substituted for a portion of the divalent metal atoms. When obtaining such hexagonal ferrite, it suffices to use a salt containing a substituent atom together with a divalent metal salt. Examples of atoms that can be substituted for divalent metal atoms are any of the atoms given further below. However, there is no limitation thereto.

The hexagonal ferrite precursor set forth above can be obtained by mixing an iron salt and a divalent metal salt in a water-based solution, desirably in a water-based solution containing a base. In this water-based solution, a salt containing iron atoms and divalent metal atoms (for example, a hydroxide) will precipitate in particle form, desirably as colloidal particles. The particles that precipitate out here can be subsequently placed in the presence of high-temperature, high-pressure water to convert them to ferrite and obtain hexagonal ferrite.

Salts of alkaline earth metals such as barium, strontium, and calcium, as well as lead salts can be employed as divalent metal salts. The type of divalent metal atom can be determined based on the desired hexagonal ferrite. For example, when barium ferrite is desired, a divalent metal salt in the form of a barium salt is employed. When strontium ferrite is desired, a strontium salt is employed. When mixed crystals of barium ferrite and strontium ferrite are desired, it suffices to employ divalent metal salts in the form of a barium salt and a strontium salt in combination. The salt is desirably a water-soluble salt. For example, hydroxides; halides such as chlorides, bromides, and iodides; and nitrates can be employed. Hydrates can also be employed.

Water-soluble salts of iron, such as halides such as chlorides, bromides, and iodides; nitrates; sulfates; carbonates; organic acid salts; and complexes can be employed as the iron salt. Hydrates can also be employed. The blending ratio and quantities added of the iron salt and divalent metal salt can be determined in accordance with the desired ferrite composition. In addition to an iron salt and a divalent metal salt, salts of optional atoms that are capable of constituting hexagonal ferrite along with iron atoms and divalent metal atoms can also be added. Examples of such optional atoms are Nb, Co, Ti, and Zn. The quantities of salts of these optional atoms that are added can be determined in accordance with the desired ferrite composition.

A hexagonal ferrite precursor containing the atoms that were contained in these salts will precipitate when the salts set forth above are mixed with a water-based solution desirably containing a base. Primarily hydroxide ions ($OH^-$) in the water-based solution containing a base are thought to form a hydroxide sol with the iron ions contained in the iron salt and divalent metal ions contained in the divalent metal salt, thereby forming the precursor. The precursor that precipitates out here is subsequently converted to hexagonal ferrite (ferrite conversion).

In the present invention, the base refers to one or more bases as defined by one or more among Arrhenius, Bronsted, or Lewis (Arrhenius bases, Bronsted bases, or Lewis bases). The same applies to the acids described in greater detail below; they are defined as one or more acids as defined by Arrhenius, Bronsted, or Lewis (Arrhenius acids, Bronsted acids, or Lewis acids).

Specific examples of bases are sodium hydroxide, potassium hydroxide, sodium carbonate, and ammonia water. However, there is no limitation thereto. Nor is there a limitation to inorganic bases; organic bases can also be employed.

Some of the salts that are added along with the base will sometimes exhibit acidity. Thus, when the water-based solution for preparing the precursor contains a base, the pH of the water-based solution is not limited to being alkaline, and will sometimes be neutral or acidic. The pH of the water-based solution is, for example, equal to or higher than 4.00 but equal to or lower than 14.00, as the pH at the solution temperature during preparation of the precursor (during the reaction). From the perspective of getting the reaction to progress smoothly to prepare the precursor, equal to or higher than 5.00 but equal to or lower than 14.00 is desirable, equal to or higher than 6.00 but equal to or lower than 13.00 is preferred, and equal to or higher than 6.00 but equal to or lower than 12.00 is of still greater preference. Having a pH of equal to or higher than 7.00 or exceeding 7.00 (neutral to alkaline) is even more preferable. The temperature of the water-based solution during the reaction can be controlled by heating or cooling, or can be left unregulated at room temperature. The solution temperature desirably falls within a range of 10 to 90° C. The reaction can progress adequately without temperature control (for example, at about 20 to 25° C.). To control the temperature, the reaction tank described further below can be equipped with heating or cooling means. The feed passage described further below can also be heated with a heating means or cooled with a cooling means to regulate the temperature.

The water-based solvent refers to solvent containing water. Water alone will do, as will a mixed solvent of water and an organic solvent. The water-based solvent that is employed to prepare the precursor desirably comprises equal to or more than 50 weight percent of water, and is preferably water alone.

The organic solvent that can be employed in combination with water in the water-based solvent is desirably one that is miscible with water or that is hydrophilic. From this perspective, the use of a polar solvent is suitable. The term "polar solvent" refers to solvent that satisfies either having a dielectric constant of equal to or higher than 15 or having a solubility parameter of equal to or higher than 8. Desirable examples of organic solvents are alcohols, ketones, aldehydes, nitriles, lactams, oximes, amides, ureas, sulfides, sulfoxides, phosphoric acid esters, carboxylic acids, esters derived from carboxylic acids, carbonic acid or carbonic acid esters, and ethers.

(ii) Reducing Compound

The reaction converting the hexagonal ferrite precursor prepared as set forth above to hexagonal ferrite can be conducted in the presence of a reducing compound selected from the group consisting of reducing organic compounds and reducing inorganic compounds. In an embodiment, the hexagonal ferrite precursor can be prepared in the presence of a reducing compound. For example, in one specific embodiment, the reducing compound can be mixed along with the starting material, base, and water-based solvent during preparation of the precursor. Placing the reducing compound in the water-based solution to prepare the precursor makes it possible to cause the reducing compound to be present at a minimum either on the surface of the precursor or in the interior thereof. Here, the term "reducing" means either having the ability to add a hydrogen atom to another compound, or the ability to donate an electron, or both. The reducing compound is desirably a compound that exists as a solid or liquid at ordinary temperature and pressure. Existing as a solid or a liquid at ordinary temperature and ordinary pressure means existing as a solid or liquid at least at 25° C. and 1 atmosphere (about 1013.25 hPa), and includes existing in a mixed solid/liquid state. The use of a compound that exists as a solid or liquid at ordinary temperature and ordinary pressure as the reducing compound is desirable to increase the degree of uniformity in the state (for example, a state of adhesion to a surface) in which the reducing compound is present in the precursor. From the perspective of processing safety, as well, a compound that exists as a solid or a liquid at ordinary temperature and pressure is desirable.

Specific examples of reducing compounds are: sodium borohydride, lithium borohydride, and other hydride compounds; aldehydes such as formalin and acetaldehyde; sulfites; carboxylic acids such as formic acid, oxalic acid, succinic acid, and ascorbic acid; lactones; aliphatic monoalcohols such as ethanol, butanol, and octanol; alicyclic monoalcohols such as terpineols; other monoalcohols; ethylene glycol, propylene glycol, diethylene glycol, dipropylene glycol, and other aliphatic diols; polyhydric alcohols such as glycerol and trimethylol propane; polyethers such as polyethylene glycol and polypropylene glycol; alkanol amines such as diethanol amine and monoethanol amine; hydroquinone; resorcinol; aminophenol; glucose; sodium citrate; and hypochlorous acid and its salts. Those of the organic compounds given further below that exhibit a reducing property, desirably those that exist as solids or liquids at ordinary temperature and ordinary pressure, can also be used as reducing compounds. Desirable examples of reducing compounds are hydrazine compounds and amino compounds.

Among the hydrazine compounds are included hydrazine ($NH_2$—$NH_2$), substituted hydrazine derivatives obtained by substituting a substituent for one or more of the four hydrogen atoms of hydrazine, and hydrates and salts thereof. In the present invention and the present specification, examples of substituents are linear, branched, and cyclic alkyl groups (such as alkyl groups having 1 to 6 carbon atoms), alkoxy groups (such as alkoxy groups having 1 to 6 carbon atoms), halogen atoms (such as fluorine, chlorine, and bromine atoms), aryl groups (such as phenyl groups), and heteroaryl groups. Specific examples of desirable hydrazine compounds are: hydrazine, hydrazine monohydrate, hydrazine carbonate, hydrazinium sulfate, phenyl hydrazine, 1-methyl-1-phenyl hydrazine, and 1,1-diphenylhydrazine hydrochloride.

The amine compound can be a primary amine, secondary amine, or tertiary amine. The structure can contain a cyclic structure. Specific examples of amine compounds are triethylamine, triethanolamine, and dimethylaminoethanol. The organic amines set forth further below can also be employed.

When mixing in a reducing compound when preparing the precursor, equal to or more than 2 molar parts are desirably added, equal to or more than 5 molar parts are preferably added, equal to or more than 10 molar parts are more preferably added, equal to or more than 20 molar parts are still more preferably added, equal to or more than 30 molar parts are even more preferably added, equal to or more than 40 parts are even still more preferably added, and equal to or more than 50 parts are yet still more preferably added per 100 molar parts of precursor starting materials combined in the form of iron salt and divalent metal salt. The quantity added is desirably equal to or less than 300 molar parts, preferably equal to or less than 250 molar parts, more preferably equal to or less than 200 molar parts, still more preferably equal to or less than 150 molar parts, and yet still more preferably, equal to or less than 100 molar parts.

(iii) Organic Compound

The above precursor can be prepared in the presence of an organic compound (either reducing or nonreducing). It is thought that a precursor that is prepared in the presence of an organic compound can convert to hexagonal ferrite (be subjected to the conversion reaction) in a state that is surface coated with the organic compound, and crystallize following instantaneous dissolution in a reaction system in which high-temperature, high-pressure water is present, resulting in precipitation (conversion to hexagonal ferrite) of hexagonal ferrite in the form of particles. The presence of the organic compound in the vicinity of the particles during the period from dissolution to crystallization is presumed by the present inventor to contribute to reducing the size of the precipitating hexagonal ferrite particles, rendering the particle size uniform, and controlling their shape. Preparing the precursor in the presence of an organic compound is thought by the present inventor to inhibit aggregation of the precursor, reduce the size of the particles, and contribute to obtaining a precursor of good uniformity of particle size, and thus contribute to obtaining hexagonal ferrite with smaller particles and better uniformity of particle size.

Examples of the organic compound are organic carboxylic acids, organic nitrogen compounds, organic sulfur compounds, organic phosphorus compound, salts thereof, surfactants, and various polymers. Polymers having weight average molecular weights of about 1,000 to 100,000 are suitable. Those exhibiting solubility in water are desirable. Examples of desirable polymers are nonionic polymers and hydroxyl group-containing polymers. Alkali metal salts are suitable as the above salt. In the present invention, the weight average molecular weight refers to a value that is measured by gel permeation chromatography (GPC) and converted to a polystyrene equivalent.

Examples of organic carboxylic acids are aliphatic carboxylic acids, alicyclic carboxylic acids, and aromatic carboxylic acids. Aliphatic carboxylic acids are desirable. The aliphatic carboxylic acid may be a saturated aliphatic carboxylic acid or an unsaturated aliphatic carboxylic acid, with an unsaturated carboxylic acid being preferred. The number of carbon atoms of the carboxylic acid is not specifically limited; for example, it can be equal to or more than 2. By way of example, it can be equal to or lower than 24, desirably equal to or lower than 20, preferably equal to or lower than 16. Specific examples of aliphatic carboxylic acids are: oleic acid, linoleic acid, linolenic acid, caprylic acid, capric acid, lauric acid, behenic acid, stearic acid, myristic acid, palmitic acid, myristoleic acid, palmitoleic acid, vaccenic acid, eicosenoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, nonadecanoic acid, icosanoic acid, and acetic acid; as well as dicarboxylic acids such as malonic acid, succinic acid, and adipic acid. However, there is no limitation thereto. Organic carboxylic acids and their salts are suitable organic compounds for the above-described manufacturing method.

Examples of organic nitrogen compounds are organic amines, organic amide compounds, and nitrogen-containing heterocyclic compounds.

The organic amine can be a primary amine, secondary amine, or tertiary amine. Primary and secondary amines are desirable. Aliphatic amines are an example, as are primary and secondary aliphatic amines. The number of carbon atoms of the amines is not specifically limited; examples are equal to or more than 5 but equal to or lower than 24, desirably equal to or more than 8 and equal to or lower than 20, preferably equal to or more than 12 but equal to or lower than 18. Specific examples of organic amines are alkylamines such as oleylamine, laurylamine, myristylamine, palmitylamine, stearylamine, octylamine, decylamine, dodecylamine, tetradecylamine, hexadecylamine, octadecylamine, and dioctylamine; aromatic amines such as aniline; hydroxyl group-comprising amines such as methylethanolamine and diethanolamine; and derivatives thereof.

Examples of nitrogen-containing heterocyclic compounds are saturated and unsaturated heterocyclic compounds having three to seven-membered rings with 1 to 4 nitrogen atoms. Hetero atoms in the form of sulfur atoms, oxygen atoms, and the like can be contained. Specific examples are pyridine, lutidine, cholidine, and quinolines.

Examples of organic sulfur compounds are organic sulfides, organic sulfoxides, and sulfur-containing heterocyclic compounds. Specific examples are dialkyl sulfides such as dibutyl sulfide; dialkyl sulfoxides such as dimethyl sulfoxide and dibutyl sulfoxide; and sulfur-containing heterocyclic compounds such as thiophene, thiolane, and thiomorpholine.

Examples of organic phosphorus compounds are phosphoric acid esters, phosphines, phosphine oxides, trialkyl phosphines, phosphorous acid esters, phosphonic acid esters, sub-phosphonic acid esters, phosphinic acid esters, and sub-phosphinic acid esters. Examples are tributyl phosphine, trihexyl phosphine, trioctyl phosphine, and other trialkyl phosphines; tributyl phosphine oxide, trihexyl phosphine oxide, trioctyl phosphine oxide (TOPO), tridecyl phosphine oxide, and other trialkyl phosphine oxides.

Examples of polymers and surfactants are polyethylene glycol, polyoxyethylene (1) lauryl ether phosphate, lauryl ether phosphate, sodium polyphosphate, sodium bis(2-ethylhexyl)sulfosuccinate, sodium dodecylbenzene sulfonate, polyacrylic acid and its salts, polymethacrylic acid and its salts, polyvinyl alcohol, other hydroxyl group-comprising polymers, polyvinyl pyrrolidone, other nonionic polymers, and hydroxyethyl cellulose. Any from among cationic, anionic, and nonionic surfactants, as well as amphoteric surfactants, can be employed. Anionic surfactants are desirable.

The organic compound is desirably mixed in a quantity of 0.01 to 1,000 weight parts, preferably 0.05 to 500 weight parts, and more preferably, 0.1 to 300 weight parts per 100 weight parts of hexagonal ferrite precursor. In the present invention, quantities described based on the quantity of hexagonal ferrite precursor are either the values actually measured or theoretical production quantities calculated from the quantity of starting materials.

(Mixing the Above Components)

The sequence of mixing the starting materials, base, reducing compound added as needed, and organic compound during preparation of the precursor is not specifically limited. These components can be added to the water-based solvent in any order, two or more of them can be simultaneously mixed in, or all of them can be simultaneously mixed in. In an embodiment, the mixing is conducted in a reaction tank. In the reaction tank, a known stirring means such as a magnetic stirrer is normally used to stir and mix the water-based solution containing the water-based solvent and the above components. In another embodiment, the precursor is prepared in a continuous manufacturing process. The precursor is desirably prepared by converging a feed passage to which the solution containing the iron salt and divalent metal salt is being fed with a feed passage to which the base-containing water-based solution is being fed to mix the two solutions.

In an embodiment, the precursor preparing step can be conducted while continuously feeding the starting materials to the reaction tank. Feeding the starting materials continuously instead of all at once to the reaction tank in this manner is thought to contribute to the smooth progression of the reaction to prepare the precursor. The present inventor presumes that this can prevent coarsening of the precursor obtained and contribute to reducing the particle size of the hexagonal ferrite that is obtained from the precursor. From the perspective of uniformly mixing the starting material being fed, it is desirable for the reaction tank to contain at least water-based solvent prior to the start of the continuous feeding period (referred to as the "continuous feed period" hereinafter). The details regarding the water-based solvent are as set forth above. The water-based solvent in the reaction tank at the start of continuous feeding can contain one or more selected from the group consisting of iron salts, divalent metal salts, and bases. To fully achieve the effect of continuously feeding the starting material, it is desirable for the iron salt and base to not both be present in the solution (solution prior to the reaction) in the reaction tank prior to the start of the continuous feed period. This is mainly because the hydroxide that is formed by iron ions and hydroxide ions is of poor solubility in water-based solvent, so it is highly probable that the formation of precipitate will begin when both an iron salt and a divalent metal are present. Additionally, since the solubility in water-based solvent of the hydroxide that is formed by divalent metal ions and hydroxide ions is relatively high, the probability of a precipitate forming is low even when both a divalent metal salt and a base are present. Accordingly, a divalent metal salt and a base can both be present in the solution before the reaction. The pH can be adjusted with an acid or a base prior to the start of continuous feeding. The base that is employed here is as set forth above. Any of the acids known to be used to adjust pH, such as hydrochloric acid, nitric acid, and sulfuric acid, can be used without restriction as the acid. Organic acids as well as inorganic acids can also be employed as the acid.

In an embodiment, the reaction tank is a batch-type reaction tank, and in another embodiment, it is a continuous-type reaction tank. With a batch-type reaction tank, the removal of the reaction product is conducted in a separate step from feeding of the starting materials and the reaction. With a continuous-type reaction tank, removal of the product is conducted in parallel with feeding of the starting materials and the reaction. Accordingly, a continuous-type reaction tank will be equipped with at least one feed flow passage and at least one discharge flow passage. The above manufacturing method can be conducted using either of these reaction tanks. An embodiment employing a batch-type reaction tank and an embodiment employing a continuous-type reaction tank will be specifically described below with reference to the drawings. However, the present invention is not limited to these specific embodiments.

FIG. 1 is a schematic sectional view showing an example of a batch-type reaction tank that can be used to prepare precursor. The batch-type reaction tank 10 shown in FIG. 1 is equipped with feed passages 11, 12, and 13 that feed starting materials to the reaction tank. Each feed passage is connected to a starting material storage tank, not shown. The starting materials in the starting material storage tanks are normally fed to the reaction tank by feed pumps, not shown, in the form of solutions. By varying the flow rate of the feed pumps, it is possible to control the quantity of starting material fed. The iron salt, divalent metal salt, and base are fed to the reaction tank over these three feed passages, respectively. FIG. 1 shows a reaction tank equipped with three feed passages. An embodiment is shown in which an iron salt, a divalent metal salt, and a base are each fed to the reaction tank over a separate feed passage. However, it is also possible for the iron salt and the divalent metal salt to be mixed and then fed to the reaction tank over the same feed passage. Additionally, the base can be desirably fed over a separate feed passage from the starting materials to inhibit variation in the pH of the reaction liquid in the reaction tank. That is because the quantity of base that is fed can be independently established and adjusted from the quantities of starting materials fed. This point also applies to the embodiment employing a continuous-type reaction tank. In the embodiment shown in FIG. 1, since the base is fed over a feed passage separate from that of the iron salt and divalent metal salt, no base is added to the feed materials that are fed over the other feed passages (for example, iron salt and divalent metal salt, or a mixture of iron salt and divalent metal salt).

The batch-type reaction tank 10 shown in FIG. 1 is equipped with stirring vanes 14 in addition to the above feed passages. Stirring the starting materials while they are being fed can prevent a nonuniformity in pH from developing in the portion close to the discharge outlet of the feed passage and the portion far from it in the reaction liquid, and render the pH of the reaction liquid in the reaction tank uniform. The method of stirring is not limited to methods based on stirring vanes; any type of stirring method, such as a magnetic stirrer or static mixer, can be used without restriction. The stirring conditions, such as the peripheral speed of the stirring vanes, are not specifically limited.

The iron salt, divalent metal salt, and base can be fed in a solid state or in a liquid state. To facilitate achieving uniformity during mixing in the reaction tank, it is desirable to add them as liquids; for example, in the form of water-based solutions obtained by dissolving or dispersing them in suitable water-based solvent. The concentration of the salt or base in the water-based solution can be suitably set.

Feeding of the iron salt, divalent metal salt, and base can begin simultaneously for all three, or can be begun in any sequence. The point in time when both the iron salt and the base are present in the reaction liquid in the reaction tank is considered the start of the continuous feed period and the point in time when feeding of all of the starting materials stops is considered the end of the continuous feed period. The "point in time when both the iron salt and the base are present in the reaction liquid in the reaction tank" can be the point in time when feeding of either the iron salt or the base begins to a prereaction solution containing the other, the point in time when feeding of the iron salt and the base simultaneously beings to a prereaction solution not containing neither iron salt nor base, the point in time when feeding of either the iron salt or the base has been begun in advance to a prereaction solution containing neither iron salt nor base and feeding of the other begins, or the like. In the present invention, the term "simultaneously" as regards the starting of feeding and the stopping of feeding includes cases where the starting times are unintentionally skewed due to the operational precision of the devices or the like.

Feeding of the divalent metal salt to the reaction tank can begin at any stage. For example, feeding of the divalent metal to the reaction tank can begin before or after feeding of the iron salt or base, during the period between the start of feeding of one of the two and the start of feeding of the other, or the like. Feeding of the starting materials during the continuous feed period can be conducted by continuing the usual feeding (continuous feeding), or can be conducted by repeatedly starting and stopping feeding (intermittent feeding). Continuous feeding is desirable from the perspective of precisely and readily controlling the feeding of those starting materials the quantity of which being fed per unit time is subjected to controls.

Either feed quantity controls that control the quantity being fed per unit time of at least one from among the iron salt, divalent metal salt, and base during the continuous feed period, or the addition of an acid to the reaction liquid in the reaction tank, is desirably conducted based on the $pH_{before}$, which is the pH of the solution in the reaction tank prior to the start of the continuous feed period (prereaction solution), so that the pH of the reaction liquid in the reaction tank during the continuous feed period remains within the range of:

$pH_{before}-2.00 \leq pH \leq pH_{before}+2.00$.

Feed quantity controls alone, or acid addition alone, can be conducted, or feed quantity controls and acid addition can be conducted in parallel. They can be conducted in any order and with any type of repetition.

The above quantity being fed per unit time is not specifically limited. For example, it can refer to the quantity being fed per any interval, such as the quantity being fed per hour, the quantity being fed per minute, or the quantity being fed per second. For liquids, the quantity being fed per unit time can be denoted as a flow rate. Gradual mixing in by providing a continuous feed time, without mixing in the entire quantity of starting materials at once during the preparation of the precursor, is thought to primarily contribute to reducing the particle size of the hexagonal ferrite that is obtained by converting the precursor that is thus prepared. Controlling the pH of the reaction liquid in the reaction tank during the continuous feed period is presumed by the present inventor to contribute to rendering uniform the particle shape and particle size of the hexagonal ferrite obtained by converting the precursor thus prepared. This is thought by the present inventor primarily to be due to the high dependence on pH of the solubility of the starting materials, particularly the solubility of the iron salt. In this context, the term "controlling the quantity being fed per unit time" refers to changing the quantity being fed per unit time, that is, increasing it or decreasing it, increasing it and then decreasing it, or decreasing it and then increasing it, at least once. This increasing and decreasing can be continuously conducted or conducted in stages. The degree of increasing or decreasing (that is, the rate of the increase or the rate of the decrease of the quantity being fed) can be any adjustment so long as the fluctuation in pH is kept to within the desired range.

The addition of an acid is desirably done over a feed passage separate from that of the starting materials, and can be done continuously, intermittently, or all at once. The acid is as set forth above. To precisely and readily control the pH, the acid is desirably fed as a liquid, but there is no specific limitation.

To keep the pH fluctuation within a desired range during the continuous feed period by controlling the quantities fed and adding an acid, the pH of the reaction liquid in the reaction tank is desirably constantly monitored during the continuous feed period. It is also possible to keep the pH fluctuation in the reaction liquid in the reaction tank within the desired range by feeding back the monitoring results to the feed pump operating conditions (feedback control) by means of a known control program. So long as the pH is kept to within the desired range during the continuous feed period, the quantity of starting materials being fed per unit time is not specifically limited and can be suitably determined by taking productivity and the like into account. The same applies to the quantity of acid added.

The pH of the reaction liquid in the reaction tank during the continuous feed period preferably falls within the range of:

$$pH_{before}-1.50 \leq pH \leq pH_{before}+1.50;$$

more preferably falls within the range of:

$$pH_{before}-1.00 \leq pH \leq pH_{before}+1.00;$$

and still more preferably falls within the range of:

$$pH_{before}-0.50 \leq pH \leq pH_{before}+0.50$$

In an embodiment, it is desirable to control the quantity of the base, which can be the main cause of pH fluctuation, being fed per unit time. In that case, the quantity of iron salt being fed per unit time and the quantity of divalent metal salt being fed per unit time can be varied or can be left unvaried. In an embodiment, from the perspective of rendering the reaction uniform, the quantities of iron salt and divalent metal salt being fed per unit time are desirably not varied during the continuous feed period. In another embodiment, the quantity of iron salt or of divalent salt, or both, being fed per unit time can be changed without changing the quantity of base being fed per unit time.

In an embodiment employing a batch-type reaction tank, following the end of the continuous feed period, after optionally continuing stirring and mixing, the precursor-containing aqueous solution that is removed from the reaction tank is subjected to the preparation of hexagonal ferrite by a continuous hydrothermal synthesis method to convert the precursor to hexagonal ferrite. In an Embodiment A feed pipe is mounted on a batch-type reaction tank and the precursor-containing aqueous solution is directly fed to the reaction device conducting preparation of hexagonal ferrite by a continuous hydrothermal synthesis method from the batch-tape reaction tank via the feed pipe. In yet another embodiment, precursor-containing aqueous solution removed from a batch-type reaction tank is moved to a liquid tank where preparation of hexagonal ferrite is being conducted by a continuous hydrothermal synthesis process, after which the precursor is converted to hexagonal ferrite by the continuous hydrothermal synthesis process. The details of the continuous hydrothermal synthesis method are set forth further below.

The above description sets forth an embodiment of continuously feeding an iron salt, a divalent metal salt, and a base to a batch-type reaction tank. However, the feeding to the reaction tank during the continuous feed period is not limited to these three starting materials. For example, neutral water containing no acid or base, such as pure water or distilled water, and the above-described reducing compound and organic compound can also be fed to the reaction tank during the continuous feed period. The quantities of these optionally fed components being fed per unit time can be suitably set. In order to inhibit pH fluctuation in the reaction tank during the continuous feed period by controlling the quantities of starting materials added to the reaction tank as essential components per unit time, the quantities of optional components that are fed per unit time during the continuous feed period can be varied or can be maintained constant without being varied.

An embodiment employing a continuous-type reaction tank will be described next.

Figure 2:
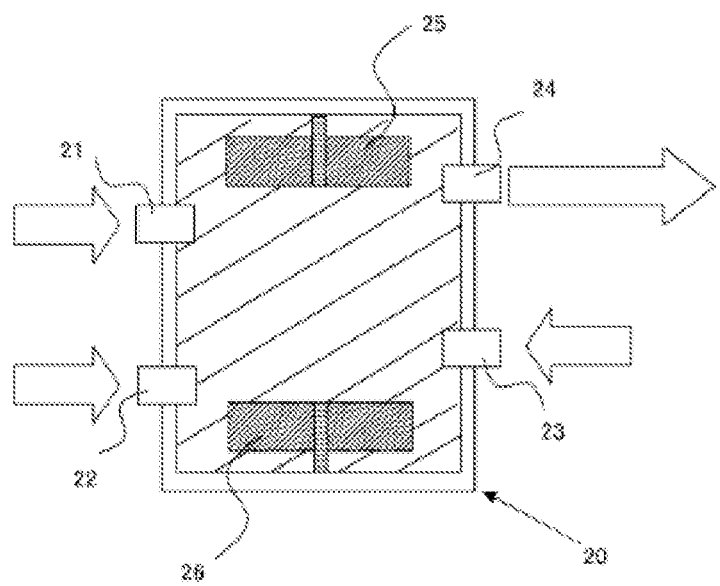
FIG. 2 is a schematic sectional view showing an example of a continuous-type reaction tank that can be used to prepare precursor.

FIG. 2 is a schematic sectional view showing an example of a continuous-type reaction tank that can be used to prepare a precursor-containing water-based solution. The continuous-type reaction tank 20 shown in FIG. 2 is equipped with feed passages 21, 22, and 23 feeding starting materials to the reaction tank. Each feed passage is connected to a starting material storage tank, not shown. In the feeding to the continuous-type reaction tank shown in FIG. 2, the starting materials in the starting material storage tanks are normally fed to the reaction tank by a feed pump, not shown, in the form of solutions. By changing the flow rate with the feed pump, it is possible to control the quantity of starting materials fed. Here, continuous-type reaction tank 20 is filled with prereaction solution prior to the start of the continuous feed period. The prereaction solution is as set forth above. In an embodiment, iron salt, divalent metal salt, and base are respectively fed to the reaction tank over three feed passages. It is desirable to feed at least the base to the reaction tank over a separate feed passage from the iron salt and divalent metal salt; it is also possible to mix the iron salt and divalent metal salt and then feed them to the reaction tank over the same feed passage. As set forth above, water, a reducing compound, and an organic compound can be fed to the reaction tank during the continuous feed period.

The continuous-type reaction tank shown in FIG. 2 is equipped with upper and lower stirring vanes 25 and 26 within the reaction tank. The rotation of stirring vanes 25 and 26 is driven by a motor, not shown, to stir and mix the reaction liquid within the reaction tank. The stirring vanes can be linked directly to the motor, or can be magnetically coupled. Either set of the stirring vanes can be disposed above or below the other, and a vertical configuration is desirable. When the stirring vanes are disposed vertically, the stirring directions above and below are desirably opposite each other. The details of stirring and mixing are as set forth above. Since the reaction tank shown in FIG. 2 is a continuous-type reaction tank, the feeding of the starting materials is conducted in parallel, and solution is removed from within the reaction tank. In the continuous-type reaction tank 20 shown in FIG. 2, removal is conducted through removal outlet 24. The rate of removal is not specifically limited, and can be determined by taking into account a balance with the quantity of starting materials being fed (the feeding rate).

Other details of the embodiment employing a continuous-type reaction tank shown in FIG. 2 are as set forth for the embodiment employing a batch-type reaction tank shown in FIG. 1.

In the further embodiment set forth above, two feed passages can be converged to mix a solution containing the iron salt and divalent metal salt and a water-based solution containing base, and prepare precursor. This is a desirable embodiment in terms of inhibiting pH fluctuation in the reaction system during hexagonal ferrite precursor preparation. The details are given further below.

<Organic Compound and Preparation of Organic Compound Solution>

The organic compound can be added during precursor preparation in an embodiment set forth above. In another embodiment, the organic compound can be added to a solvent and mixed with the precursor solution as an organic compound solution, or can be introduced into a feed passage to which high-temperature, high-pressure water is being fed. In that case, the organic compound is desirably mixed in a quantity of about 1 to 1,000 weight parts per 100 weight parts of hexagonal ferrite precursor. Water or an organic solvent that is miscible with water or hydrophilic is desirable as the solvent. From this perspective, the use of an organic solvent in the form of a polar solvent is suitable. Examples of desirable organic solvents are those given by way of example of various solvents above. The concentration of the organic compound in the organic compound solution can be set so that the above desirable quantity of organic compound is mixed in or introduced.

<Preparation of Hexagonal Ferrite>

The reaction converting hexagonal ferrite precursor to hexagonal ferrite is desirably conducted by the following process:

simultaneously or sequentially introducing the hexagonal ferrite precursor and organic compound to a feed passage to which water is being continuously fed with heating and pressurizing;

converting the hexagonal ferrite precursor to hexagonal ferrite within a reaction flow passage by continuously feeding a water-based solution containing at least the hexagonal ferrite precursor, organic compound, and water to a reaction flow passage within which a fluid flowing therein is subjected to heating and pressurizing;

discharging the water-based solution containing the hexagonal ferrite from the reaction flow passage and feeding it to a cooling element; and recovering hexagonal ferrite from the water-based solution that has been cooled in the cooling element. Here, controlling the solution temperature at the point of first contact between the hexagonal ferrite precursor and organic compound in the above feed passage is an example of one means of obtaining hexagonal ferrite powder according to an aspect of the present invention set forth above.

The pH of the water-based solution following cooling is either identical to or correlates with the pH in the reaction system within the reaction flow passage. Controlling the pH of the water-based solution following cooling is another example of a means of obtaining the above hexagonal ferrite powder.

In this context, when, for example, a flow passage of a solution containing hexagonal ferrite precursor and an organic compound is converged with a feed passage to which high-temperature, high-pressure water is being fed, the "point of first contact" is the point where the flow passage and the feed passage converge.

Further, if the flow passage of the hexagonal ferrite precursor-containing solution is converged with the feed passage to which the high-temperature, high-pressure water is fed, after which a flow passage of solution containing the organic compound is converged with the feed passage at a point positioned to the downstream side thereof, the "point of first contact" will be the point of converging of the feed passage and the flow passage of the organic compound-containing solution. In this context, the term "to the downstream side" refers to the side nearer the reaction flow passage in the feeding direction within the feed passage. The "upstream side" referred to further below refers to the opposite.

Conversely, if the flow passage of the organic compound-containing solution is converged with the feed passage to which the high-temperature, high-pressure water is fed, and the flow passage of the hexagonal ferrite precursor-containing solution is subsequently converged with the feed passage at a point positioned downstream from this point of converging, the "point of first contact" will be the point of converging of the flow passage of the hexagonal ferrite precursor-containing solution with the feed passage.

The pH of the water-based solution following the above cooling refers to the pH of the water-based solution that has been discharged through the discharge outlet of the cooling element. It is a value that is obtained by recovering at least a portion of the water-based solution that has been discharged through the discharge outlet at some position, adjusting it to a solution temperature of 25° C., and measuring the pH.

An example of a means of controlling the pH of the water-based solution that has been discharged from the reaction flow passage and cooled by the cooling element is adding a base or an acid. Specifically, it is possible to use an acidic compound as an organic compound, to use an alkaline compound as an organic compound, to mix a base, an acid, or a base and an acid into the organic compound solution, and to determine the quantities that are added so as to keep the pH of the water-based solution that has been discharged from the reaction flow passage and cooled in the cooling element to within the desired range. The term "acidic" as relates to the organic compound refers to one or more acids as defined by Arrhenius, Bronsted, or Lewis (Arrhenius acid, Bronsted acid, or Lewis acid). The term "alkaline" as relates to the organic compound refers to one or more bases as defined by Arrhenius, Bronsted, or Lewis (Arrhenius base, Bronsted base, or Lewis base). The bases and acids are as set forth above.

(Mixing the Precursor Solution, Organic Compound Solution, and High-Temperature, High-Pressure Water)

As an example of one embodiment of mixing the precursor and organic compound, as set forth above, the precursor is prepared in the presence of an organic compound. The precursor solution thus obtained contains the precursor and an organic compound, with the organic compound desirably having been coated on the surface of the precursor. This embodiment will be referred to as Embodiment A below.

In an example of another embodiment, the precursor solution and the organic compound solution are sequentially introduced into a feed passage to which high-temperature, high-pressure water is being fed. This embodiment will be referred to as Embodiment B below.

In an example of still another embodiment, the precursor solution and the organic compound solution are mixed, after which the mixed solution that has been obtained is introduced into a feed passage to which high-temperature, high-pressure water is being fed. This embodiment will be referred to as Embodiment C below.

Embodiments B and C include embodiments in which preparation of the precursor is conducted in a continuous manufacturing process.

Embodiments A to C above will be described with reference to the drawings.

FIGS. 3 to 8 are schematic descriptive drawings of manufacturing devices that can be used to manufacture hexagonal ferrite powder by continuously conducting a hydrothermal synthesis process (continuous hydrothermal synthesis process).

Figure 3:
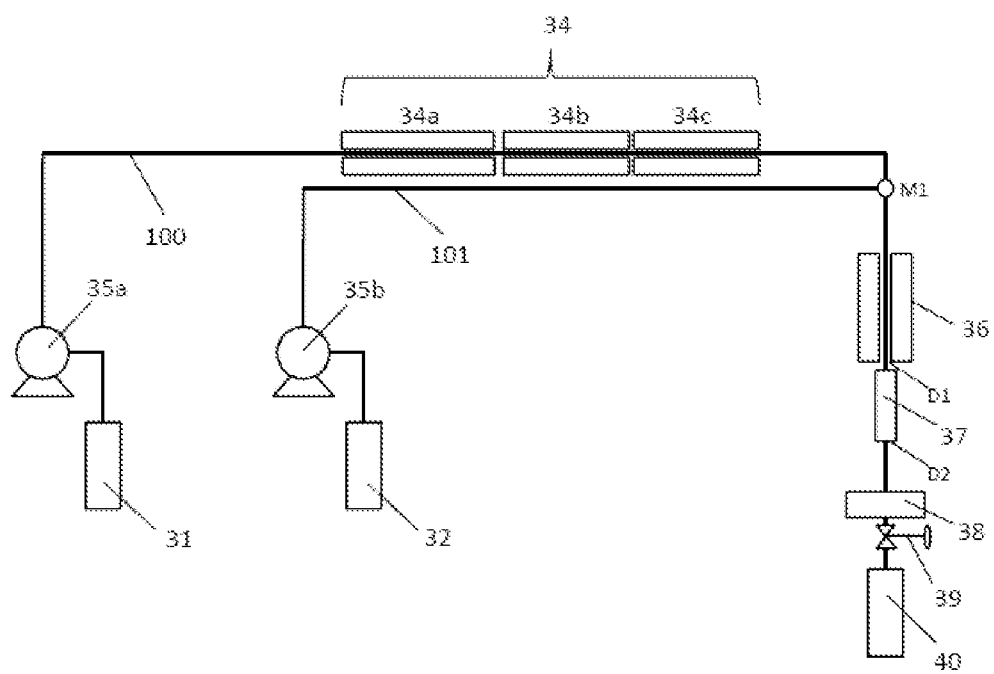
FIG. 3 is a schematic descriptive drawing of an example of a manufacturing device that can be used to prepare hexagonal ferrite by a continuous hydrothermal synthesis method.
Figure 4:
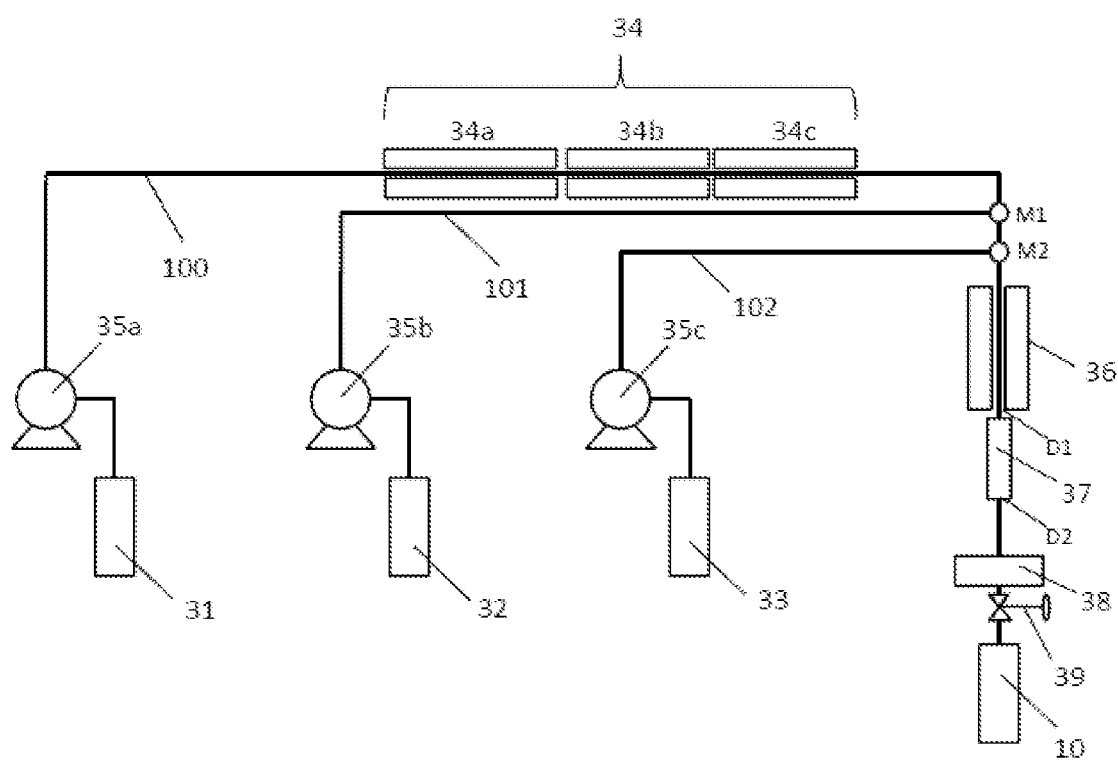
FIG. 4 is a schematic descriptive drawing of an example of a manufacturing device that can be used to prepare hexagonal ferrite by a continuous hydrothermal synthesis method.
Figure 5:
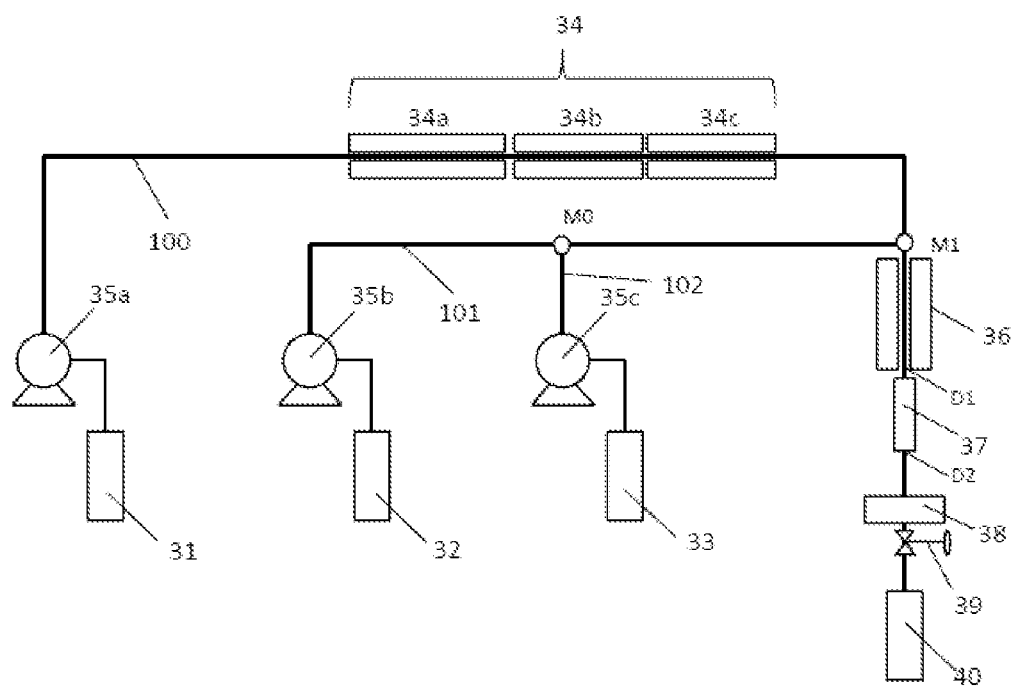
FIG. 5 is a schematic descriptive drawing of an example of a manufacturing device that can be used to prepare hexagonal ferrite by a continuous hydrothermal synthesis method.

More specifically, FIG. 3 is a schematic descriptive drawing of an example of a manufacturing device that is suited to Embodiment A. FIG. 4 is a schematic descriptive drawing of an example of a manufacturing device that is suited to Embodiment B. And FIG. 5 is a schematic descriptive drawing of an example of a manufacturing device that is suited to Embodiment C.

Figure 6:
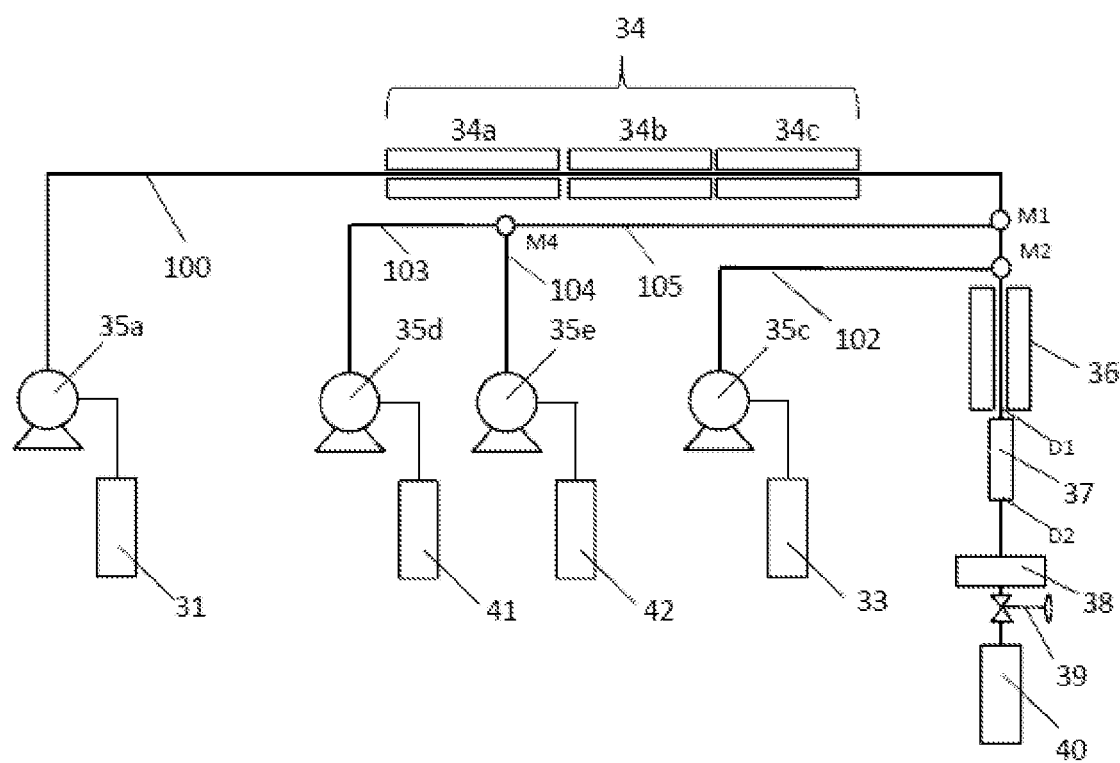
FIG. 6 is a schematic descriptive drawing of an example of a manufacturing device that can be used to prepare hexagonal ferrite by a continuous hydrothermal synthesis method.
Figure 7:
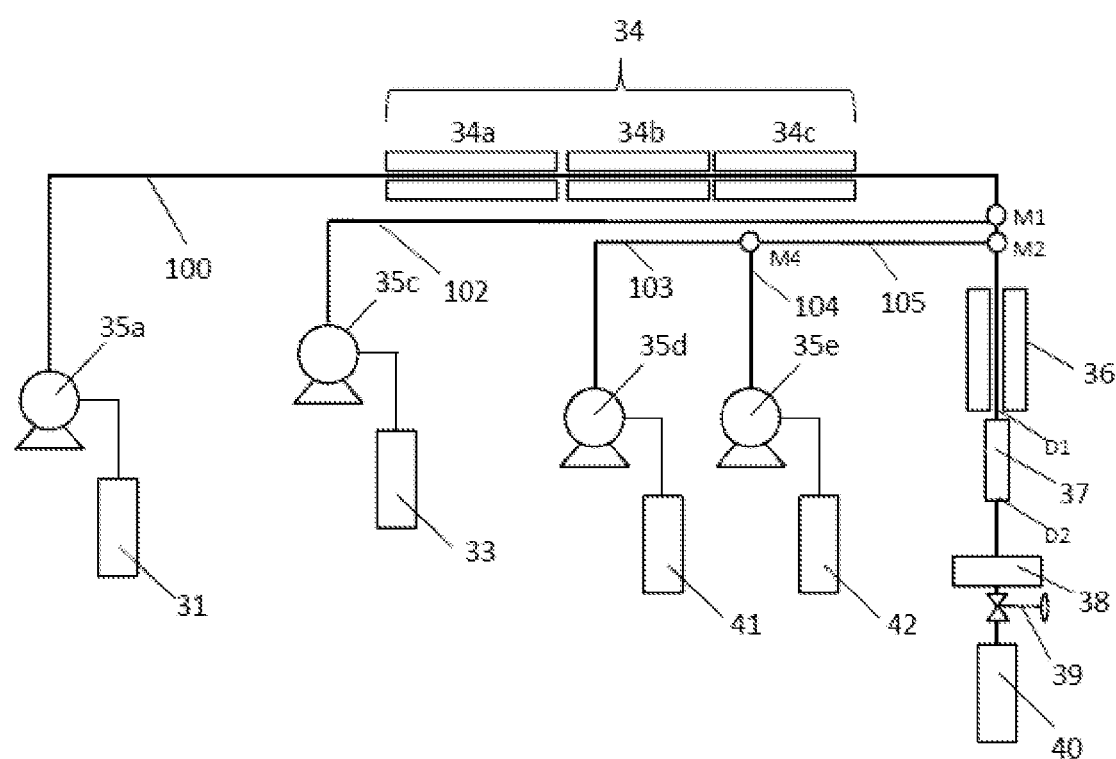
FIG. 7 is a schematic descriptive drawing of an example of a manufacturing device that can be used to prepare hexagonal ferrite by a continuous hydrothermal synthesis method.
Figure 8:
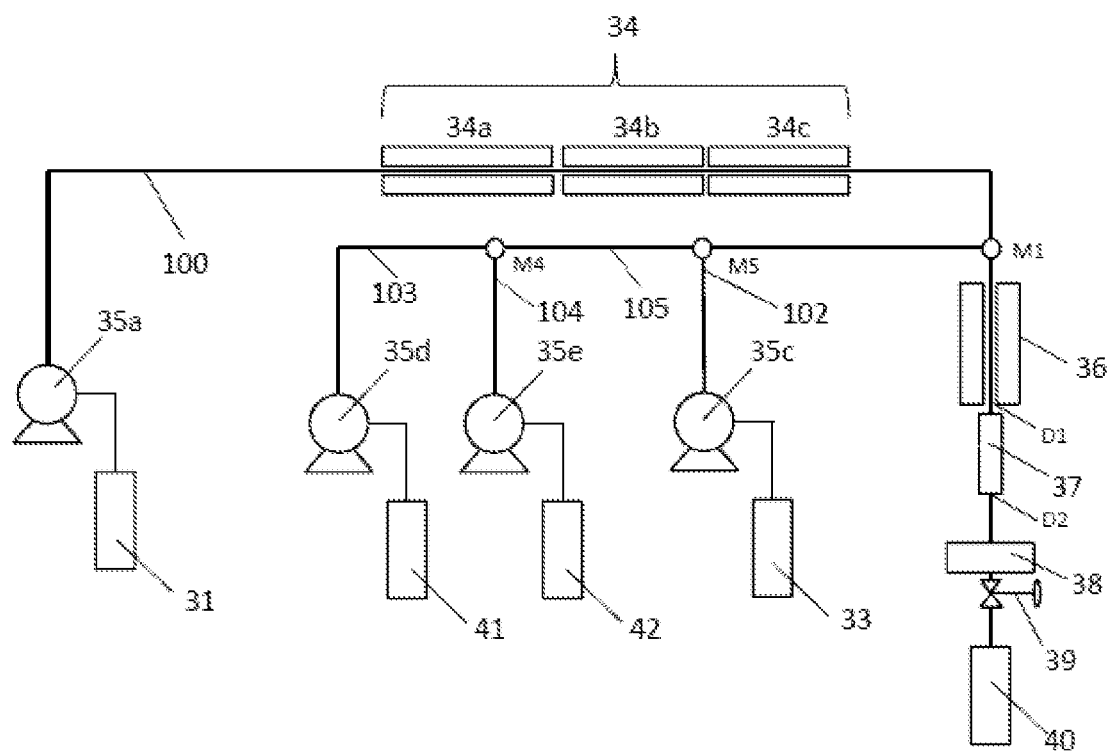
FIG. 8 is a schematic descriptive drawing of an example of a manufacturing device that can be used to prepare hexagonal ferrite by a continuous hydrothermal synthesis method.

FIGS. 6 and 7 are schematic descriptive drawings of an example of a manufacturing device that is suited to an embodiment of preparing the precursor (precursor solution) continuously in the manufacturing process in Embodiment B. FIG. 8 is a schematic descriptive drawing of an example of a manufacturing device that is suited to an embodiment of preparing the precursor (precursor solution) continuously in the manufacturing process in Embodiment C.

In FIGS. 3 to 8, identical constituent elements are denoted by identical symbols.

The example of FIG. 3 will be described. The manufacturing device shown in FIG. 3 comprises liquid tanks 31 and 32; heating means 34 (34a to 34c); pressurizing and feeding means 35a and 35b; a reaction flow passage 36; a cooling element 37; a filtering means 38; a pressure-regulating valve (back pressure valve) 39; and a recovery element 40. Fluids are fed from the various liquid tanks to feed passage 100 and flow passage 101. In the figure, there are three heating means. However, this is merely an example, and there is no limitation thereto.

The manufacturing device shown in FIGS. 4 and 5, in addition to the above configuration, also comprises a liquid tank 33, pressurizing and feeding means 35c, and flow passage 102.

The manufacturing device shown in FIGS. 6, 7, and 8, in addition to the above configuration, also comprises liquid tanks 41 and 42; pressurizing and feeding means 35d and 35e; and flow passages 103, 104, and 105.

In an embodiment, pure water, distilled water, or the like is introduced into liquid tank 31; hexagonal ferrite precursor solution (which contains an organic compound in Embodiment A) is introduced into liquid tank 32; and organic compound solution is introduced into liquid tank 33. The water that has been introduced into liquid tank 31 is fed to feed passage 100 while being pressurized by pressurizing and feeding means 35a, and is heated by heating means 34. This heating and pressurizing is done to place the water in a state of high temperature and high pressure, and desirably done to place the water in a subcritical to supercritical state. Because water in a subcritical to supercritical state can exhibit extremely high reactivity, contact with water in such a state instantaneously can place the hexagonal ferrite precursor in a highly reactive state, making it possible for the conversion to ferrite to progress early on. Water will generally assume a subcritical to supercritical state when heated to equal to or higher than 200° C. and pressurized to equal to or higher than 20 MPa. Accordingly, this heating and pressurizing of the water is desirably done to a temperature of equal to or higher than 200° C. and a pressure of equal to or higher than 20 MPa. The high-temperature, high-pressure water that has been heated and pressurized is fed into feed passage 100 and reaches mixing element M1.

In Embodiment A (FIG. 3), a precursor solution containing hexagonal ferrite precursor and an organic compound is fed to pipe 101 by pressurizing and feeding means 35b from liquid tank 32, and converges with feed passage 100 feeding high-temperature, high-pressure water in mixing element M1. Accordingly, in Embodiment A, the point of first contact where the hexagonal ferrite precursor and the organic compound first come into contact in the feed passage is mixing element M1.

In Embodiment B (FIG. 4), hexagonal ferrite precursor solution is fed from liquid tank 2 by pressurizing and feeding means 35b to flow passage 101, converging with feed passage 100 feeding high-temperature, high-pressure water in mixing element M1. Subsequently, the mixed flow of high-temperature, high-pressure water and hexagonal ferrite precursor solution converges in mixing member M2 with the organic compound solution fed from liquid tank 33 by pressurizing and feeding means 35c to flow passage 102. Accordingly, in Embodiment B, the point of first contact where the hexagonal ferrite precursor solution begins to mix with the organic compound in the feed passage is mixing element M2. In Embodiment B, in contrast to the above example, organic compound solution can be introduced to liquid tank 32 and hexagonal ferrite precursor solution can be introduced into liquid tank 33.

In Embodiment C (FIG. 5), hexagonal ferrite precursor solution is fed from liquid tank 32 by pressurizing and feeding means 35b to flow passage 101 and converges with the organic compound solution that is being fed to flow passage 102 by pressurizing and feeding means 5c from liquid tank 33 in mixing element M0. Subsequently, the mixed flow of hexagonal ferrite precursor solution and organic compound solution passes over flow passage 101 and converges with high-temperature, high-pressure water in mixing element M1. Accordingly, in Embodiment C, the point of first contact where the hexagonal ferrite precursor solution and the organic compound begin to mix in the feed passage is mixing element M1. In Embodiment C, as well, in contrast to the above example, the organic compound solution can be introduced into liquid tank 32 and the hexagonal ferrite precursor solution can be introduced into liquid tank 33.

The manufacturing device shown in FIGS. 6 and 7 is a manufacturing device suited to an embodiment in which hexagonal ferrite precursor solution is continuously prepared in the manufacturing process in Embodiment B. In the manufacturing device shown in FIGS. 6 and 7, a solution containing an iron salt and a divalent metal salt (referred to as the "starting material solution" below) is introduced into liquid tank 41 and a base-containing water-based solution (normally not containing an iron salt or a divalent metal salt) is introduced into liquid tank 42. The starting material solution that is fed to pipe 103 by pressurizing and feeding means 35*d* from liquid tank 41 and the base-containing water-based solution that is fed to pipe 104 by pressurizing and feeding means 35*e* from liquid tank 42 converge in mixing element M4. In contrast to the above example, it is also possible for the base-containing water-based solution to be introduced into liquid tank 41 and the starting material solution to be introduced into liquid tank 42.

In the manufacturing device shown in FIG. 6, the mixed flow thus obtained passes over flow passage 105 and converges in mixing element M1 with high-temperature, high-pressure water that has been fed to flow passage 100 by pressurizing and feeding means 35*a* from liquid tank 31 and heated by heating means 34. The mixed flow thus obtained then converges in mixing element M2 with the organic compound solution that has been fed to flow passage 102 by pressurizing and feeding means 35*c* from liquid tank 33.

In the manufacturing device shown in FIG. 7, the mixed solution obtained as set forth above passes over flow passage 105 and converges in mixing element M2 with a mixed flow that has been obtained by converging in mixing element M1 the high-temperature, high-pressure water that has been fed to flow passage 100 by pressurizing and feeding means 35*a* from liquid tank 31 and heated by heating means 34 with the organic compound solution that has been fed to flow passage 102 by pressurizing and feeding means 35*c* from liquid tank 33.

In the manufacturing device shown in FIGS. 6 and 7, the point of first contact where mixing of the hexagonal ferrite precursor solution and the organic compound begins in the above feed passage is mixing element M2.

The details of subsequent processing in the manufacturing device of FIGS. 6 and 7 are as set forth in the description of the manufacturing device shown in FIG. 4 above.

The manufacturing device shown in FIG. 8 is a manufacturing device that is suited to an embodiment in which the hexagonal ferrite precursor is prepared in a continuous manufacturing process in Embodiment C. In the manufacturing device shown in FIG. 8, a solution (starting material solution) containing an iron salt and a divalent metal salt is introduced to a liquid tank 41 and a base-containing water-based solution (normally not containing an iron salt or a divalent metal salt) is introduced into a liquid tank 42. The starting material solution that is fed to pipe 103 by pressurizing and feeding means 35*d* from liquid tank 41 is converged in mixing element M4 with the base-containing water-based solution that is fed to pipe 104 by pressurizing and feeding means 35*e* from liquid tank 42. In contrast to the above example, the base-containing aqueous solution can be introduced to liquid tank 41 and the starting material solution can be introduced to liquid tank 42.

The mixed flow thus obtained is converged in mixing element M5 of flow passage 105 with the organic compound solution fed to pipe 102 by pressurizing and feeding means 35*c* from liquid tank 33. The mixed solution thus obtained is converged in mixing member M1 with high-temperature, high-pressure water that is fed to flow passage 100 by pressurizing and feeding means 35*a* from liquid tank 31 and heated by heating means 34. In the manufacturing device shown in FIG. 8, the point of first contact where the hexagonal ferrite precursor solution beings to mix with the organic compound in the feed passage is mixing element M1.

The details of the subsequent process are as set forth in the description of the manufacturing device shown in FIG. 5 above.

The present inventor presumes that controlling the solution temperature at the point of first contact can contribute to obtaining hexagonal ferrite powder containing a large quantity of isotropic particles satisfying equation (1) as well as having the above-stated average particle size. The lower the temperature at the point of first contact, the milder the reaction converting the hexagonal ferrite precursor to hexagonal ferrite progresses in the presence of an organic compound. As a result, it is thought that the particle size may increase, and that the particle size may end up being varied. From this perspective, the temperature at the point of first contact is desirably equal to or higher than 200° C., preferably equal to or higher than 230° C., and more preferably, equal to or higher than 250° C. The present inventor presumes that when the temperature at the point of first contact is excessively high, the reaction progresses too fast, decreasing the isotropy of the particle shape of the hexagonal ferrite powder obtained. From these perspectives, the temperature at the point of first contact is desirably equal to or lower than 400° C., preferably equal to or lower than 380° C., and more preferably, equal to or lower than 350° C. In an embodiment, it is still more preferably less than 300° C., and yet still more preferably, equal to or lower than 290° C.

The temperature at the point of first contact can be controlled by, for example, controlling the temperature of the solution that is fed to the point of first contact. To that end, for example, it is possible to provide at any position within the device a known temperature control means for heating and cooling the solutions that are fed to flow passages 101, 102, 103, 104, and 105. In Embodiment C, in which the flow passage of hexagonal ferrite precursor solution and the flow passage of organic compound solution are converged, the mixed liquid obtained is introduced to a feed passage to which high-temperature, high-pressure water is flowing. From the perspective of obtaining hexagonal ferrite powder with little variation in particle size, the mixed liquid is desirably not heated following converging of the flow passage of hexagonal ferrite precursor solution and the flow passage of the organic compound solution. Accordingly, in the above embodiments, if the hexagonal ferrite precursor solution is heated, the heating is desirably conducted prior to converging the organic compound solution. For example, in one desirable embodiment, a heating means can be provided to the upstream side of mixing element M0 of flow passage 101 in the manufacturing device shown in FIG. 1. In that case, a cooling means can also be provided to the downstream side of mixing element M0. It then suffices to conduct the heating and cooling of individual solutions in a manner so as to achieve the desired solution temperature at the point of first contact.

The temperature at the point of first contact can also be controlled by adjusting one or more from among the temperature and flow rate of the high-temperature, high-pressure water; the flow rate of the hexagonal ferrite precursor solution; the flow rate of the organic compound solution; and the flow rate of the mixed flow obtained by combining the hexagonal ferrite precursor solution and the organic compound solution. It suffices to effect this adjustment so that the solution temperature at the point of first contact is kept to the desired temperature. As an example, the solution temperature of the solutions and mixed flow normally differs from (is normally lower than) the temperature of the high-temperature, high-pressure water that is fed to the feed passage. Thus, it is possible to control the temperature at the point of first contact by varying the ratio of the flow rate of the mixed flow, the solutions that are introduced to the feed passage, and the flow rate of the high-temperature, high-pressure water.

Following mixing in the above mixing elements, the mixed flow of high-temperature, high-pressure water, hexagonal ferrite precursor, and organic compound (the water-based solution containing hexagonal ferrite precursor, organic compound, and water) is fed through feed passage 100 to the reaction flow passage 6. In reaction flow passage 36, the mixed flow is heated as well as being pressurized by pressurizing means 35a to place the water contained in the mixed flow in reaction flow passage 36 in a state of high temperature and high pressure, desirably in a subcritical to supercritical state, so that conversion of the hexagonal ferrite precursor to ferrite can advance. Subsequently, solution in which hexagonal ferrite precursor has been converted to ferrite and thus containing particles of hexagonal ferrite is discharged through discharge outlet D1. The discharged solution is fed to cooling element 37 and cooled in cooling element 37. Subsequently, the hexagonal ferrite particles are captured by a filtering means (filter or the like) 38. The hexagonal ferrite particles that have been captured by filtering means 38 are released by filtering means 38, pass through pressure-regulating valve 39, and are recovered in recovery element 40.

Regarding the heating and pressurizing reaction flow passage 36, the reaction system in which water is present is heated to equal to or higher than 300° C. and pressurized to a pressure of equal to or higher than 20 MPa to put the water in a subcritical to supercritical state, creating a reaction field of extremely high reactivity. Placing the hexagonal ferrite precursor in this state can cause ferrite conversion to advance rapidly, yielding hexagonal ferrite magnetic particles. Accordingly, the heating temperature is desirably a temperature at which the mixed flow in the reaction flow passage reaches equal to or higher than 300° C. The heating temperature is preferably set so that the temperature of the water-based solution that is discharged from the reaction flow passage and fed to the cooling element reaches equal to or higher than 350° C. but equal to or lower than 450° C. Here, the solution temperature refers to the solution temperature at the discharge outlet of the reaction flow passage (discharge outlet D1 in the devices shown in FIGS. 3 to 8). Conducting the reaction that converts the hexagonal ferrite precursor in the reaction flow passage into hexagonal ferrite under temperature conditions such that the solution temperature at the discharge outlet of the reaction flow passage falls within the above-stated range is desirable from the perspective of enhancing the magnetic characteristics of the hexagonal ferrite powder obtained. This has been presumed by the present inventor to occur because of improved crystallinity of the hexagonal ferrite powder. The solution temperature is preferably equal to or higher than 360° C. but equal to or lower than 430° C., more preferably equal to or higher than 380° C. but equal to or lower than 420° C. The pressure that is applied to the mixed flow in the reaction flow passage is desirably equal to or higher than 20 MPa, preferably falling within a range of 20 to 50 MPa.

As set forth above, the water-based solution that has been discharged from the reaction flow passage is cooled in the cooling element. This cooling in the cooling element can completely halt the reaction that converts hexagonal ferrite precursor into hexagonal ferrite. This is desirable to obtain hexagonal ferrite powder with little variation in particle size. For this reason, the cooling in the cooling element is desirably conducted to a temperature of the water-based solution within the cooling element of equal to or lower than 100° C., and preferably conducted to equal to or higher than room temperature (about 20 to 25° C.) but equal to or lower than 100° C. The cooling can be conducted using a known cooling means such as a water-cooling device the interior of which is cooled by circulating cold water. The same pressure as that applied in the feed passage and reaction flow passage is normally applied to the water-based solution in the cooling element.

The pH of the water-based solution following cooling in the cooling element is desirably equal to or higher than 6.00 but equal to or lower than 12.00. The "pH . . . following cooling" referred to here is the pH of the water-based solution that has been discharged through the discharge outlet (discharge outlet D2 in FIGS. 3 to 8) of the cooling element, as set forth above. This pH can be measured by collecting a portion of the water-based solution recovered in recovery element 40 after passing through pressure-regulating valve 39, and adjusting the solution temperature to 25° C. The components that cause the pH of the water-based solution to change in the cooling element are normally not added. Accordingly, the pH of the water-based solution following cooling is either the same as the pH of the reaction system in the reaction flow passage in which the reaction that converts the hexagonal ferrite precursor to hexagonal ferrite is conducted, or correlates with it. The above-described means of controlling the pH can be used to control the pH of the water-based solution following cooling. From the perspective of ease of controlling the particle shape of the hexagonal ferrite, the pH is desirably equal to or lower than 11.50, preferably equal to or lower than 11.00. To further decrease the particle size of the hexagonal ferrite and further decrease variation in the particle size, the pH is desirably equal to or higher than 6.50.

In the manufacturing method set forth above, it is desirable to employ high pressure-use metal piping as the feed passages and flow passages (also referred to as "piping" hereinafter) to apply pressure to the fluids that are fed through the interior. The metal constituting the piping is desirably SUS316, SUS 304, or some other stainless steel, or a nickel-based alloy such as Inconel (Japanese registered trademark) or Hastelloy (Japanese registered trademark) because of their low-corrosion properties. However, there is no limitation thereto. Equivalent or similar materials can also be employed. The piping of laminate structure described in Japanese Unexamined Patent Publication (KOKAI) No. 2010-104928, which is expressly incorporated herein by reference in its entirety, can also be employed.

In the manufacturing devices shown in FIGS. 3 to 8, the various mixing elements have structures such that pipes are joined by T-joints. The reactors described in Japanese Unexamined Patent Publication (KOKAI) Nos. 2007-268503, 2008-12453, 2010-75914, and the like, which are expressly incorporated herein by reference in their entirety, can be employed as the mixing elements. The material of the reactor is desirably the material described in Japanese Unexamined Patent Publication (KOKAI) No. 2007-268503, 2008-12453, or 2010-75914, which are expressly incorporated herein by reference in their entirety. Specifically, the metals set forth above as being suitable for constituting piping are desirable. However, there is no limitation thereto, and equivalent or similar materials can be employed. Combination with low-corrosion titanium alloys, tantalum alloy, ceramics and the like is also possible.

A number of specific embodiments of methods of manufacturing hexagonal ferrite powder according to an aspect of the present invention have been set forth above. However, the above hexagonal ferrite powder is not limited to being manufactured by the manufacturing methods of these specific embodiments.

Magnetic Recording Medium

A further aspect of the present invention relates to a magnetic recording medium which comprises a magnetic layer comprising ferromagnetic powder and binder on a nonmagnetic support, wherein the ferromagnetic powder is the above hexagonal ferrite powder. Using the hexagonal ferrite powder according to an aspect of the present invention as ferromagnetic powder can make it possible to form a magnetic layer of high coating durability, and to obtain a magnetic recording medium exhibiting good electromagnetic characteristics. This point was discovered by the present inventor.

The magnetic recording medium according to an aspect of the present invention will be described in greater detail below.

Magnetic Layer

Details of the ferromagnetic powder that is employed in the magnetic layer, and of the method of manufacturing it, are as set forth above.

The magnetic layer contains ferromagnetic powder and binder. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0029 to 0031 of Japanese Unexamined Patent Publication (KOKAI) No. 2010-24113, which is expressly incorporated herein by reference in its entirety, with regard to the above binders. Polyisocyanate curing agents can also be employed with the above resins.

Additives can be added as needed to the magnetic layer. Examples of additives are abrasives, lubricants, dispersing agents, dispersion adjuvants, antifungal agents, antistatic agents, oxidation inhibitors, solvents, and carbon black. The additives set forth above can be suitably selected for use from among commercial products based on the properties desired.

Nonmagnetic Layer

The contents of the nonmagnetic layer will be described in detail next. The magnetic recording medium of an aspect of the present invention can comprise a nonmagnetic layer containing nonmagnetic powder and binder between the nonmagnetic support and the magnetic layer. The nonmagnetic powder that is employed in the nonmagnetic layer can be an organic or an inorganic material. Carbon black and the like can also be employed. Examples of inorganic materials are metals, metal oxides, metal carbonates, metal sulfates, metal nitrides, metal carbides, and metal sulfides. Nonmagnetic powders of these materials are available as commercial products and can be manufactured by known methods. For details, reference can be made to Japanese Unexamined Patent Publication (KOKAI) No. 2010-24113, paragraphs 0036 to 0039.

The binders, lubricants, dispersing agents, additives, solvents, dispersion methods, and the like of the magnetic layer are also suitable for use for the nonmagnetic layer. Techniques that are known for magnetic layers can also be applied to the quantity and type of binder, the quantities and types of additives and dispersing agents added, and the like. Carbon black and organic material powders can also be added to the nonmagnetic layer. In this regard, by way of example, reference can be made to Japanese Unexamined Patent Publication (KOKAI) No. 2010-24113, paragraphs 0040 to 0042.

Nonmagnetic Support

Examples of nonmagnetic supports are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable.

These supports can be subjected in advance to corona discharge, plasma treatment, adhesion-enhancing treatment, heat treatment, or the like. The surface roughness of a nonmagnetic support that is suited to use in the present invention is desirably a center average roughness Ra of 3 nm to 10 nm at a cutoff value of 0.25 mm.

Layer Structure

In the thickness structure of the magnetic recording medium according to an aspect of the present invention, the thickness of the nonmagnetic support is desirably 3 µm to 80 µm. The thickness of the magnetic layer can be optimized based on the amount of saturation magnetization of the magnetic head employed, the length of the head gap, and the bandwidth of the recording signal. Generally, it can be 0.01 µm to 0.15 µm, desirably 0.02 µm to 0.12 µm, and preferably, 0.03 µm to 0.10 µm. It suffices for the magnetic layer to be comprised of a least one layer, but it can separated into two or more layers having different magnetic characteristics. The structures of known multilayer magnetic layers can be applied.

The thickness of the nonmagnetic layer is for example 0.1 µm to 3.0 µm, desirably 0.3 µm to 2.0 µm, and preferably 0.5 µm to 1.5 µm. The nonmagnetic layer of a magnetic recording medium according to an aspect of the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

Backcoat Layer

A backcoat layer can be provided on the opposite surface of the nonmagnetic support from that on which the magnetic layer is present in the magnetic recording medium. The backcoat layer desirably comprises carbon black and inorganic powder. The formula of the magnetic layer and nonmagnetic layer can be applied to the binder and various additives used to form the backcoat layer. The thickness of the back coat layer is desirably equal to or less than 0.9 µm, preferably 0.1 µm to 0.7 µm.

Manufacturing Method

The process of manufacturing the coating liquid for forming the magnetic layer, nonmagnetic layer, or backcoat layer normally comprises at least a kneading step, dispersing step, and mixing steps provided as needed before and after these steps. The various steps can each be divided into two or more steps. All of the starting materials employed in the present invention, such as ferromagnetic powder, nonmagnetic powder, binder, carbon black, abrasives, antistatic agents, lubricants, and solvents, can be added either initially during the step or part way through. Any individual starting material can be divided for addition in two or more steps. For example, polyurethane can be divided up and added during a kneading step, dispersing step, or mixing step following dispersion to adjust the viscosity. In an aspect of the present invention, conventionally known manufacturing techniques can be employed for some of the steps. In the kneading step, it is desirable to employ an apparatus with powerful kneading strength in the kneading step, such as an open kneader, continuous kneader, pressurizing kneader, or extruder. Details on these kneading treatments are described in Japanese Unexamined Patent Publication (KOKAI) Heisei No. 1-106338 and Heisei No. 1-79274, which are expressly incorporated herein by reference in their entirety. Glass beads can also be used to disperse the magnetic layer coating liquid, nonmagnetic layer coating liquid, or backcoat layer coating liquid. High specific gravity dispersing beads in the form of zirconia beads, titania beads, and steel beads are also suitable. The particle diameter and packing rate of these dispersing beads can be optimized for use. A known dispersing apparatus can be employed. For details on methods of manufacturing magnetic recording media, reference can be made to Japanese Unexamined Patent Publication (KOKAI) No. 2010-24113, paragraphs 0051 to 0057, for example.

The magnetic recording medium according to an aspect of the present invention as set forth above has a magnetic layer containing the above-described hexagonal ferrite powder, and thus can exhibit good electromagnetic characteristics and good running durability. Thus, it is suitable as a large-capacity magnetic recording medium such as a backup tape.

EXAMPLES

The present invention will be described in greater detail below through Examples. However, the present invention is not limited to the embodiments shown in Examples. The "parts" and "percent" indicated below denote "weight parts" and "weight percent," respectively. Unless specifically stated otherwise, the steps and evaluations set forth below were conducted in air at 23° C.±1° C.

1. Examples and Comparative Examples Relating to the Manufacturing of Hexagonal Ferrite Powder

Example 1-1

(1) Preparation of Precursor-Containing Aqueous Solution

A precursor-containing aqueous solution was prepared by the following method with the batch-type reaction tank 10 schematically rendered in FIG. 1. In the following process, heating controls were effected by means of a heater to maintain a solution temperature in the reaction tank of 30° C. During the period from the start to the end of feeding the aqueous solution given below, stirring was continuously conducted with stirring vanes 14.

To pure water filling reaction tank 10 were added 4.0 g of iron (III) nitrate nonahydrate ($Fe(NO_3)_3 \cdot 9H_2O$) per 100 g of pure water and the mixture was stirred at a solution temperature of 30° C. To the aqueous solution thus prepared was fed at a constant rate (flow rate 7.5 mL/min) over feed passage 13 a potassium hydroxide aqueous solution with a concentration of 1 mol/L. When feeding of the potassium hydroxide aqueous solution had ended, a potassium hydroxide aqueous solution prepared by adding 1.6 g of barium hydroxide octahydrate ($Ba(OH)_2 \cdot 8H_2O$) per 100 g of pure water was fed at a constant flow rate (flow rate 25 mL/min) over feed passage 11 to prepare a precursor-containing aqueous solution (hydroxide sol).

(2) Synthesis of Hexagonal Ferrite (Barium Ferrite Nanoparticles) by a Continuous Hydrothermal Synthesis Process The aqueous solution (sol) prepared in (1) above was introduced into liquid tank 32 of the manufacturing device shown in FIG. 3. SUS316BA tube was employed as the piping in the manufacturing device.

While using a high-pressure pump 35a to feed the pure water that had been introduced into liquid tank 31, it was heated by a heater 34 and high-temperature, high-pressure water was caused to flow through pipe 100. In this process, the temperature and pressure were controlled such that the temperature of the high-temperature, high-pressure water after passing through heating means 34c was 345° C. and the pressure was 30 MPa.

The aqueous solution (sol) that had been introduced into liquid tank 32 was fed at 25° C. to pipe 101 with a high-pressure pump 35b and mixed with high-temperature, high-pressure water in mixing element M1. Next, an organic compound solution of oleic acid dissolved in methanol (concentration 0.75 mol/L) was fed with a high-pressure pump 35c to pipe 102 at 25° C., and converged with a mixed solution of high-temperature, high-pressure water and aqueous solution (hydroxide sol) in mixing element M2. The solution temperature in mixing element M2 was measured with a thermocouple. Following converging with the organic compound solution, the mixed flow was heated and pressurized in reaction flow passage 36 to synthesize hexagonal ferrite (convert the precursor). In reaction flow passage 36, the mixed flow was pressurized to 30 MPa and heated to a temperature of equal to or higher than 300° C. to render the solution temperature (as measured by a thermocouple) 350° C. at the discharge outlet D1 of reaction flow passage 36.

Subsequently, the liquid containing hexagonal ferrite was discharged from reaction flow passage 36, cooled to equal to or lower than 100° C. in cooling element 37 equipped with a cooling mechanism, passed through pressure-regulating valve 39, and recovered in recovery element 40. A portion of the solution recovered was collected and adjusted to a solution temperature of 25° C. The pH was then measured with a pH meter (portable pH meter D series, made by Horiba). Hexagonal ferrite particles were collected from the remainder of the solution recovered from the recovery element. The collected particles were washed with ethanol and centrifuged to separate the powder.

Example 1-2

The organic compound solution was changed to a potassium oleate aqueous solution (concentration 0.75 mol/L) of potassium oleate dissolved in pure water and the pH of the potassium oleate aqueous solution was adjusted by adding potassium hydroxide. As a result, the pH of the solution recovered in the recovery element became the value shown in Table 1.

Heating was conducted such that the solution temperature (as measured by thermocouple) at the discharge outlet D1 of reaction flow passage 36 became 400° C.

The remainder was implemented in the same manner as in Example 1-1.

Example 1-3

A precursor-containing aqueous solution was prepared by the method indicated below using the batch-type reaction tank 10 schematically indicated in FIG. 1.

The remainder was conducted in the same manner as in Example 1-1.

The following process was conducted while controlling the temperature with a heater to maintain a solution temperature in the reaction tank of 30° C. During the period from the start to the end of feeding of the aqueous solution set forth below, stirring was continued with stirring vanes 14.

The pH of the pure water in reaction tank 10 was adjusted to 11.50 with acid or a base as a prereaction solution.

A barium hydroxide aqueous solution prepared by adding 1.6 g of barium hydroxide octahydrate ($Ba(OH)_2.8H_2O$) per 100 g of pure water was fed by a feed pump from a storage tank over a feed passage 11, an iron (III) aqueous solution prepared by adding 4.1 g of iron (III) nitrate nonahydrate ($Fe(NO_3)_3.9H_2O$) per 100 g of pure water was fed by a feed pump from a storage tank over a feed passage 12, and a potassium hydroxide aqueous solution with a concentration of 1 mol/L was fed by a feed pump from a storage tank over a feed passage 13 to begin feeding to reaction tank 10. The feeding of the three aqueous solutions to the reaction tank was done simultaneously by setting the operation program of the feed pumps. The three aqueous solutions were continuously fed from the start to the end of feeding. The flow rates of the barium hydroxide aqueous solution and the iron (III) nitrate aqueous solution were both set to 25 $cm^3$/min and the quantities fed per unit time were maintained constant during feeding (supplying). By contrast, the flow rate of the potassium hydroxide aqueous solution was controlled by means of a program (feedback control program) that fed back the results of pH monitoring and controlled the flow rate. As a result, the flow rate was repeatedly changed within a range of about 5.0 to 10.0 $cm^3$/min.

Subsequently, feeding of the three aqueous solution to reaction tank 10 was simultaneously stopped. This yielded a precursor-containing aqueous solution (hydroxide sol).

The maximum difference between the pH of the prereaction solution and the pH that was continuously monitored during feeding to reaction tank 10 was 0.70. The pH at the end of feeding was 12.00.

Example 1-4

(1) Preparing a Starting Material Solution

Barium hydroxide ($Ba(OH)_2.8H_2O$) and iron (III) nitrate ($Fe(NO_3)_3.9H_2O$) were dissolved in pure water to prepare an aqueous solution containing an iron salt and a barium salt (starting material solution). The combined concentration of the iron salt and barium salt in the starting material solution was 0.075 mol/L, and the molar ratio of Ba/Fe was 0.5.

An aqueous solution of potassium hydroxide (concentration 0.20 mol/L) was prepared by adding potassium hydroxide to water and dissolving it.

(2) Preparing an Organic Compound Solution

Oleic acid was dissolved in ethanol to prepare an organic compound solution (concentration 0.75 mol/L).

(3) Hexagonal Ferrite Synthesis Reaction

The starting material solution prepared in (1) above was introduced into liquid tank 41 of the manufacturing device shown in FIG. 6, the potassium hydroxide aqueous solution prepared in (1) above was introduced into liquid tank 12, and the organic compound solution prepared in (2) above (concentration 0.75 mol/L) was introduced into liquid tank 33. SUS316BA tubing was employed as the piping in the manufacturing device.

High-temperature, high-pressure water was fed to pipe 100 by heating with heater 34 the pure water that had been introduced into liquid tank 31 while feeding it with high-pressure pump 35a. In this process, the temperature and the pressure were controlled so that the temperature of the high-temperature, high-pressure water was 350° C. and the pressure was 30 MPa after passing through heating means 34c.

The starting material solution and the potassium hydroxide aqueous solution were fed to pipes 103 and 104 at solution temperatures of 25° C. using heating and pressurizing means (high-pressure pumps 35d and 35e) such that the ratio by volume of the starting material solution:potassium hydroxide aqueous solution=50:50; mixed in mixing element M4; and then fed to pipe 105 and mixed with high-pressure, high-temperature water in mixing element M1.

The organic compound solution was fed at a solution temperature of 25° C. to flow passage 102 using a heating and pressurizing means (high-pressure pump 35c) such that the ratio by volume of (starting material solution+potassium hydroxide aqueous solution):organic compound solution=40:60; mixed with the high-temperature, high-pressure water in mixing element M2; and then heated and pressurized in reaction vessel 36 to synthesize (convert the precursor) hexagonal ferrite.

The mixed flow in reaction flow passage 36 was pressurized to 30 MPa and heated to a temperature of equal to or higher than 300° C. so that the solution temperature (as measured by thermocouple) at discharge outlet D1 of reaction flow passage 36 was 400° C.

Subsequently, the liquid containing hexagonal ferrite was discharged from reaction flow passage 36, cooled to equal to or lower than 100° C. in cooling element 37 equipped with a water-cooling mechanism, passed through pressure-regulating valve 39, and recovered in recovery element 40. A portion of the recovered liquid was collected and the pH was measured with a pH meter (portable pH meter D series, made by Horiba) after adjustment to a liquid temperature of 25° C. Hexagonal ferrite particles were collected from the remainder of the liquid recovered from the recovery element. The particles that were collected were washed with ethanol and then centrifuged to separate the powder.

Example 1-5

(1) Preparation of Starting Material Solution

Barium hydroxide ($Ba(OH)_2.8H_2O$) and iron (III) nitrate ($Fe(NO_3)_3.9H_2O$) were dissolved in pure water to prepare an aqueous solution containing an iron salt and a barium salt (starting material solution). The combined concentration of the iron salt and barium salt in the starting material solution was 0.075 mol/L, and the molar ratio of Ba/Fe was 0.5

An aqueous solution of potassium hydroxide (concentration 0.20 mol/L) was prepared by adding potassium hydroxide to water and dissolving it.

(2) Preparing an Organic Compound Solution

Oleic acid was dissolved in ethanol to prepare an organic compound solution (concentration 0.75 mol/L).

(3) Hexagonal Ferrite Synthesis Reaction

The starting material solution prepared in (1) above was introduced into liquid tank 41 of the manufacturing device shown in FIG. 7, the potassium hydroxide aqueous solution prepared in (1) above was introduced into liquid tank 42, and the organic compound solution prepared in (2) above was introduced into liquid tank 33. SUS316BA tubing was employed as the piping in the manufacturing device.

High-temperature, high-pressure water was fed to pipe 100 by heating with heater 34 the pure water that had been introduced into liquid tank 31 while feeding it with high-pressure pump 35a. In this process, the temperature and the pressure were controlled so that the temperature of the high-temperature, high-pressure water was 350° C. and the pressure was 30 MPa after passing through heating means 34c.

The organic compound solution was fed to pipe 102 at a solution temperature of 25° C. using a heating and pressurizing means (high-pressure pump) 35c such that the ratio by volume of (starting material solution+potassium hydroxide aqueous solution):organic compound solution=40:60, and then mixed with the high-temperature, high-pressure water in mixing element M1.

The starting material solution and potassium hydroxide aqueous solution were fed to pipes 103 and 104 respectively at a solution temperature of 25° C. using heating and pressurizing means (high-pressure pumps) 35d and 35d such that the ratio by volume of the starting material solution: potassium hydroxide aqueous solution was 50:50, and then mixed in mixing element M4. The mixed flow was then fed to pipe 105 and merged with high-temperature, high-pressure water in mixing element M2. Next, in reactor 36, heating and pressurizing were conducted to synthesize hexagonal ferrite (convert the precursor).

The mixed flow in reaction flow passage 36 was pressurized to 30 MPa and heated to a temperature of equal to or higher than 300° C. such that the solution temperature (as measured by thermocouple) at the discharge outlet D1 of reaction flow passage 36 became 400° C.

Subsequently, the liquid containing hexagonal ferrite was discharged from reaction flow passage 36 and cooled to equal to or lower than 100° C. in cooling element 37 equipped with a water-cooling mechanism. It passed through pressure-regulating valve 39 and was recovered in recovery element 40. A portion of the solution that was recovered was collected and the pH was measured with a pH meter (portably pH meter D series, made by Horiba) after adjusting the temperature to 25° C. Hexagonal ferrite particles were collected from the remainder of the liquid recovered from the recovery element. The collected particles were washed with ethanol and centrifuged to separate powder.

Comparative Example 1-1

The temperature of the high-temperature, high-pressure water fed to feed passage 100 was raised by adjusting the temperature setting of heater 34. As a result, the temperature in mixing element M2 became the value indicated in Table 1.

The remainder was conducted in the same manner as in Example 1-1.

Comparative Example 1-2

The quantity of potassium hydroxide added to the potassium oleate aqueous solution was increased from Example 1-2 and the pH of the liquid that was recovered in the recovery element became the value shown in Table 1.

The remainder was conducted in the same manner as in Example 1-1.

Comparative Example 1-3

The quantity of potassium hydroxide solution that was added when preparing the precursor-containing solution was reduced relative to Example 1-1. As a result, the pH of the solution recovered in the recovery element became the value shown in Table 1.

The remainder was conducted in the same manner as in Example 1-1.

Evaluation Methods (1) Identification by X-Ray Diffraction Analysis

When the powders obtained in the Examples and Comparative Examples were subjected to X-ray diffraction analysis, all were determined to be hexagonal ferrite (barium ferrite).

(2) Average Particle Size (Average Major Axis Length) and Coefficient of Variation in Particle Size The average particle size (average major axis length) of the powders, average particle size (average major axis length) of all particles determined to be isotropic particles satisfying equation (1) in (3) below, and the coefficient of variation in particle size (major axis length) of the powders obtained in the Examples and Comparative Examples were obtained by the methods set forth above with an electron microscope in the form of a model H-9000 transmission electron microscope made by Hitachi.

(3) Observation of Particle Shape

The shape of 500 particles extracted randomly from the powders prepared in the Examples and Comparative Examples was observed by the method set forth above and the ratio accounted for by isotropic particles satisfying equation (1) among all particles was calculated. The major axis length/minor axis length of all particles determined to be isotropic particles satisfying equation (1) in Examples 1-1 to 1-3 was equal to or greater than 1.0.

(4) Measurement of Saturation Magnetization as and Coercive Force Hc

The saturation magnetization as and coercive force Hc of the hexagonal ferrite powders obtained in the Examples and Comparative Examples were measured with a vibrating sample magnetometer (made by Toei-Kogyo) at a magnetic field strength of 1,194 kA/m (15 kOe).

(5) Measurement of SFD

The level of magnetization of the magnetic field was measured with the same device and at the same magnetic field strength as when measuring the coercive force. The full width at half maximum of the differential curve normalized by the coercive force was adopted as the SFD.

(6) Measurement of the Anisotropy Constant and Thermal Stability KuV/kT

Measurements were made at Hc measurement element magnetic field sweep rates of 3 minutes and 30 minutes with a vibrating sample magnetometer (made by Toei-Kogyo). The equation relating Hc due to thermal fluctuation and magnetization switching volume was used to calculate the activation volume V and the anisotropy constant Ku. KuV/kT was calculated from the values calculated.

$$Hc = 2Ku/Ms(1-(KuT/kV)\ln(At/0.693))^{1/2})$$

(In the equation, Ku: anisotropy constant; Ms: saturation magnetization; k: Boltzmann constant; T: absolute temperature; V: activation volume; A: spin precession frequency; t: magnetic field switching time.)

The results of the above are given in Table 1.

(Other Components)
Stearic acid: 2 parts
Butyl stearate: 6 parts
Polyisocyanate (Coronate made by Nippon Polyurethane Industry Co., Ltd.): 2.5 parts

TABLE 1

|  | Examples | | | | | Comparative Examples | | |
| --- | --- | --- | --- | --- | --- | --- | --- | --- |
|  | 1-1 | 1-2 | 1-3 | 1-4 | 1-5 | 1-1 | 1-2 | 1-3 |
| Solution temperature in mixing element M2 | 280° C. | 290° C. | 280° C. | 290° C. | 290° C. | 320° C. | 290° C. | 280° C. |
| pH following cooling | 7.00 | 11.30 | 7.10 | 6.8 | 6.8 | 6.90 | 12.50 | 5.95 |
| Solution temperature at discharge outlet of reaction flow passage | 350° C. | 400° C. | 350° C. | 400° C. | 400° C. | 400° C. | 400° C. | 350° C. |
| Organic compound | Oleic acid | Potassium oleic acid | Oleic acid | Oleic acid | Oleic acid | Oleic acid | Potassium oleic acid | Oleic acid |
| Average major axis length | 18.0 nm | 27.0 nm | 21.0 nm | 17.0 nm | 16.0 nm | 36.0 nm | 44.0 nm | 9.5 nm |
| Ratio accounted for by isotropic particles satisfying equation (1) among all particles (ratio of number of particles) | 87% | 81% | 93% | 90% | 88% | 40% | 62% | 88% |
| Average major axis length of isotropic particles satisfying equation (1) | 14.0 nm | 20.0 nm | 16.0 nm | 15 nm | 14 nm | 22.0 nm | 35.0 nm | 8.0 nm |
| Coefficient of variation in major axis length of isotropic particles satisfying equation (1) | 22% | 22% | 19% | 22% | 21% | 23% | 27% | 20% |
| Saturation magnetization [A·m²/kg] | 35 | 42 | 41 | 40 | 35 | 31 | 33 | 22 |
| Coercive force | 231 kA/m (2900 Oe) | 263 kA/m (3300 Oe) | 259 kA/m (3250 Oe) | 231 kA/m (2900 Oe) | 227 kA/m (2850 Oe) | 227 kA/m (2850 Oe) | 255 kA/m (3200 Oe) | 227 kA/m (2850 Oe) |
| SFD | 0.6 | 0.5 | 0.4 | 0.5 | 0.4 | 1.8 | 1.5 | 0.5 |
| KuV/kT | 78 | 83 | 85 | 79 | 77 | 53 | 72 | 51 |

2. Examples and Comparative Examples Relating to Magnetic Recording Media (Magnetic Tape)

Examples 2-1 to 2-5, Comparative Examples 2-1 to 2-3

(1) Formula of Magnetic Layer Coating Liquid
(Magnetic Liquid)
Ferromagnetic powder (powder obtained in above Example or Comparative Example, listed in Table 2): 100 parts
SO₃Na group-containing polyurethane resin: 14 parts
  (weight average molecular weight: 70,000, SO₃Na groups: 0.4 meq/g)
Cyclohexanone: 150 parts
Methyl ethyl ketone: 150 parts
(Abrasive Liquid)
Abrasive liquid A Alumina abrasive (average particle size: 100 nm): 3 parts
Sulfonic acid group-containing polyurethane resin: 0.3 part
  (weight average molecular weight: 70,000, SO₃Na groups: 0.3 meq/g)
Cyclohexanone: 26.7 parts
Abrasive liquid B Diamond abrasive (average particle size: 100 nm): 1 part
Sulfonic acid group-containing polyurethane resin: 0.1 part
  (weight average molecular weight: 70,000, SO₃Na groups: 0.3 meq/g)
Cyclohexanone: 26.7 parts
(Silica Sol)
Colloidal silica (average particle size: 100 nm): 0.2 part
Methyl ethyl ketone: 1.4 parts (Solvent added to finish)
Cyclohexanone: 200 parts
Methyl ethyl ketone: 200 parts
(2) Formula of Nonmagnetic Layer Coating Liquid
Nonmagnetic inorganic powder α-iron oxide: 100 parts
  Average particle size: 10 nm
  Average acicular ratio: 1.9
  BET specific surface area: 75 m²/g
Carbon black (average particle size: 20 nm): 25 parts
SO₃Na group-containing polyurethane resin: 18 parts
  (weight average molecular weight: 70,000, SO₃Na groups: 0.2 meq/g)
Stearic acid: 1 part
Cyclohexanone: 300 parts
Methyl ethyl ketone: 300 parts
(3) Formula of Backcoat Layer Coating Liquid
Nonmagnetic inorganic powder α-iron oxide: 80 parts
  Average particle size: 0.15 μm
  Average acicular ratio: 7
  BET specific surface area: 52 m²/g
Carbon black (average particle size: 20 nm): 20 parts
Vinyl chloride copolymer: 13 parts
Sulfonic acid group-comprising polyurethane resin: 6 parts
Phenylphosphonic acid: 3 parts
Cyclohexanone: 155 parts
Methyl ethyl ketone: 155 parts
Stearic acid: 3 parts
Butyl stearate: 3 parts
Polyisocyanate: 5 parts
Cyclohexanone: 200 parts
  (3) Fabrication of Magnetic Tape
  The above magnetic powder was dispersed for 24 hours with a batch-type vertical sand mill. A dispersing medium in the form of 0.5 mm Φ zirconia beads was employed. The abrasive liquid was dispersed for 24 hours in a batch-type ultrasonic device (20 kHz, 300 W). These dispersions were added to the other components (silica sol, other components, and solvents added to finish) and then processed for 30 minutes in a batch-type ultrasonic device (20 kHz, 300 W). Subsequently, filtering was conducted with a filter having an average pore size of 0.5 µm to prepare a magnetic layer coating liquid.

For the nonmagnetic layer coating liquid, the various components were dispersed for 24 hours in a batch-type vertical sand mill. A dispersing medium in the form of 0.1 mm Φ zirconia beads was employed. The dispersion obtained was filtered with a filter having an average pore size of 0.5 µm to prepare a nonmagnetic layer coating liquid.

For the backcoat layer coating liquid, the various components excluding the lubricants (stearic acid and butyl stearate), the polyisocyanate, and 200 parts of cyclohexanone were kneaded and diluted in an open kneader, and subjected to 12 passes of dispersion processing in a horizontal bead mill disperser using 1 mm Φ zirconia beads at a bead fill rate of 80%, a rotor tip circumferential speed of 10 m/s with a single-pass retention time of 2 minutes. Subsequently, the remaining components were added to the dispersion and stirred with a dissolver. The dispersion obtained was filtered with a filter having a mean pore size of 1 µm to prepare a backcoat layer coating liquid.

Subsequently, the nonmagnetic layer coating liquid was coated and dried to a dry thickness of 100 nm on a polyethylene naphthalate support (with a centerline surface roughness (Ra value) of 1.5 nm as measured by an optical 3D roughness meter, a crosswise Young's modulus of 8 GPa, and a lengthwise Young's modulus of 6 GPa) 5 µm in thickness, and the magnetic layer coating liquid was coated thereover in a quantity calculated to yield a dry thickness of 70 nm. While the magnetic layer coating liquid was still wet, a magnetic field with a magnetic field strength of 0.6 T was applied in a direction perpendicular to the coated surface to conduct a perpendicular orientation treatment. The magnetic layer coating liquid was then dried. The backcoat layer coating liquid was then coated and dried to a thickness of 0.4 µm on the opposite surface of the support.

A calender comprised only of metal rolls was then used to conduct a surface leveling treatment at a speed of 100 m/min, a linear pressure of 300 kg/cm, and a temperature of 100° C. A heat treatment was then conducted for 36 hours in a dry environment of 70° C. After the heat treatment, the product was slit to ½ inch width to obtain a magnetic tape.

Evaluation Methods

1. Evaluation of Electromagnetic Characteristics (Signal-to-Noise Ratio (SNR))

Magnetic signals were recorded under the conditions indicated below in the lengthwise direction of the various magnetic tapes that had been fabricated, and the signals were reproduced with MR (magnetoresistive) heads. The reproduced signals were frequency analyzed with a Spectrum Analyzer made by Shibasoku. The ratio of the output at 300 kfci to the noise integrated over a range of 0 to 600 kfci was adopted as the SNR.

(Recording and Reproduction Conditions)
Recording: Recording track width 5 µm
  Recording gap 0.17 µm
  Head saturation flux density Bs 1.8 T
Reproduction: Reproduction track width 0.4 µm
  Shield distance (sh-sh distance) 0.08 µm
  Recording wavelength 300 kfci 2. Evaluation of Coating Durability (Scratch Resistance (Alumina Scratches))

In an environment with a temperature of 23° C. and a relative humidity RH of 10%, alumina spheres measuring 4 mm in diameter were run back and forth 20 times with a load of 20 g over the surface of the magnetic layer of each of the magnetic tapes fabricated, the surface of the magnetic layer of the tape was examined under an optical microscope (magnification: 200-fold), and evaluation was conducted based on the following scale.

A: No scratches observed on the surface of the sample in the field of view of the optical microscope
B: Scratches observed in 1 to 5 spots on the surface of the sample in the field of view of the optical microscope
C: Scratches observed in 6 to 10 spots on the surface of the sample in the field of view of the optical microscope
D: Scratches observed in 11 to 50 spots on the surface of the sample in the field of view of the optical microscope
E: Scratches observed in more than 50 spots on the surface of the sample in the field of view of the optical microscope The results of the above are given in Table 2.

TABLE 2

|  | Ferromagnetic powder | SNR | Coating durability |
| --- | --- | --- | --- |
| Example2-1 | Example1-1 | +0.4 dB | B |
| Example2-2 | Example1-2 | +0.5 dB | A |
| Example2-3 | Example1-3 | +0.6 dB | A |
| Example2-4 | Example1-4 | +0.5 dB | B |
| Example2-5 | Example1-5 | +0.4 dB | B |
| Comp. Ex. 2-1 | Comp. Ex. 1-1 | ±0.0 dB | C |
| Comp. Ex. 2-2 | Comp. Ex. 1-2 | −0.3 dB | D |
| Comp. Ex. 2-3 | Comp. Ex. 1-3 | −0.3 dB | E |

Evaluation Results

As shown in Table 2, the magnetic layers of the magnetic tapes of Examples 2-1 to 2-5 exhibited high coating durability. The magnetic tapes of Examples 2-1 to 2-5 exhibited good electromagnetic characteristics (high SNRs).

As shown in Table 1, the hexagonal ferrite powders employed in the magnetic layers of the magnetic tapes of Examples 2-1 to 2-5 had small average particles sizes and contained many isotropic particles. The present inventor presumes that these factors contributed to the good electromagnetic characteristics and high coating durability achieved.

The present invention is useful in a field of manufacturing magnetic recording media for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. Hexagonal ferrite powder, which comprises equal to or more than 81% but equal to or less than 93% on a particle number basis of isotropic hexagonal ferrite particles satisfying equation (1), the balance being either isotropic hexagonal ferrite particles which do not satisfy equation (1) or anisotropic hexagonal ferrite particles:

$$\text{major axis length/minor axis length} < 2.0 \qquad (1),$$

having an average particle size of equal to or greater than 10.0 nm but equal to or less than 35.0 nm, and having a saturation magnetization of equal to or greater than 30 A·m$^2$/kg.

2. The hexagonal ferrite powder according to claim 1, which has a coercive force of equal to or greater than 159 kA/m but equal to or less than 318 kA/m.

3. The hexagonal ferrite powder according to claim 1, which has thermal stability satisfying equation (A):

$$60 \leq K_u V/kT \qquad (A)$$

wherein, in equation (A), Ku denotes an anisotropy constant, V denotes an activation volume, k denotes Boltzmann constant, and T denotes absolute temperature.

4. The hexagonal ferrite powder according to claim 1, which has a switching field distribution of equal to or less than 0.8.

5. The hexagonal ferrite powder according to claim 1, which has an average particle size of equal to or greater than 20.0 nm but equal to or less than 30.0 nm.

6. The hexagonal ferrite powder according to claim 1, wherein the average particle size of the isotropic particles satisfying equation (1) is equal to or greater than 10.0 nm but equal to or less than 30.0 nm.

7. The hexagonal ferrite powder according to claim 1, wherein the average particle size of the isotropic particles satisfying equation (1) is equal to or greater than 15.0 nm but equal to or less than 25.0 nm.

8. The hexagonal ferrite powder according to claim 1, wherein the coefficient of variation in the average particle size of the isotropic particles satisfying equation (1) is equal to or less than 30%.

9. The hexagonal ferrite powder according to claim 1, which is ferromagnetic powder for magnetic recording.

10. The hexagonal ferrite powder according to claim 1, which has a switching field distribution of equal to or less than 0.8.

11. The hexagonal ferrite powder according to claim 1, wherein the average particle size of the hexagonal ferrite powder is equal to or greater than 10.0 nm but equal to or less than 27.0 nm.

12. A magnetic recording medium according to claim 10, wherein the average particle size of the hexagonal ferrite powder is equal to or greater than 10.0 nm but equal to or less than 27.0 nm.

13. A magnetic recording medium according to claim 12, wherein the saturation magnetization of the hexagonal ferrite powder is equal to or greater than 35 A·m$^2$/kg.

14. A magnetic recording medium, which comprises a magnetic layer comprising ferromagnetic powder and binder on a nonmagnetic support, wherein the ferromagnetic powder is hexagonal ferrite powder comprising equal to or more than 81% but equal to or less than 93% on a particle number basis of isotropic hexagonal ferrite particles satisfying equation (1), the balance being either isotropic hexagonal ferrite particles which do not satisfy equation (1) or anisotropic hexagonal ferrite particles:

$$\text{major axis length/minor axis length} < 2.0 \qquad (1),$$

having an average particle size of equal to or greater than 10.0 nm but equal to or less than 35.0 nm, and having a saturation magnetization of equal to or greater than 30 A·m$^2$/kg.

15. The magnetic recording medium according to claim 14, wherein the hexagonal ferrite powder has a coercive force of equal to or greater than 159 kA/m but equal to or less than 318 kA/m.

16. The magnetic recording medium according to claim 14, wherein the hexagonal ferrite powder has thermal stability satisfying equation (A):

$$60 \leq K_u V/kT \qquad (A)$$

wherein, in equation (A), Ku denotes an anisotropy constant, V denotes an activation volume, k denotes Boltzmann constant, and T denotes absolute temperature.

17. The magnetic recording medium according to claim 14, wherein the hexagonal ferrite powder has an average particle size of equal to or greater than 20.0 nm but equal to or less than 30.0 nm.

18. The magnetic recording medium according to claim 14, wherein the average particle size of the isotropic particles satisfying equation (1) is equal to or greater than 10.0 nm but equal to or less than 30.0 nm.

19. The magnetic recording medium according to claim 14, wherein the average particle size of the isotropic particles satisfying equation (1) is equal to or greater than 15.0 nm but equal to or less than 25.0 nm.

20. The magnetic recording medium according to claim 14, wherein the coefficient of variation in the average particle size of the isotropic particles satisfying equation (1) in the hexagonal ferrite powder is equal to or less than 30%.

21. The hexagonal ferrite powder according to claim 11, wherein the saturation magnetization of the hexagonal ferrite powder is equal to or greater than 35 A·m$^2$/kg.

* * * * *